United States Patent
Weitsman

(10) Patent No.: US 9,555,540 B1
(45) Date of Patent: Jan. 31, 2017

(54) BLIND SLIDE-MOUNT FASTENER ALIGNMENT APPARATUS, KIT AND METHOD

(71) Applicant: CW Consulting Associates, LLC, Saratoga, CA (US)

(72) Inventor: Kevin L. Weitsman, Saratoga, CA (US)

(73) Assignee: CW Consulting Associates, LLC, Saratoga, CA (US)

( * ) Notice: Subject to any disclaimer, the term of this patent is extended or adjusted under 35 U.S.C. 154(b) by 0 days.

(21) Appl. No.: 15/275,319

(22) Filed: Sep. 23, 2016

Related U.S. Application Data

(63) Continuation of application No. PCT/US2016/053208, filed on Sep. 22, 2016.

(60) Provisional application No. 62/222,091, filed on Sep. 22, 2015.

(51) Int. Cl.
  *B25D 5/00* (2006.01)
  *B25H 7/04* (2006.01)
  *F16M 13/02* (2006.01)

(52) U.S. Cl.
  CPC .............. *B25H 7/045* (2013.01); *F16M 13/02* (2013.01)

(58) Field of Classification Search
  CPC ............ B25H 7/045; B25H 7/04; F16M 13/02
  USPC ..................... 33/579, 562, 616, 626; 248/547
  See application file for complete search history.

(56) References Cited

U.S. PATENT DOCUMENTS

| | | |
|---|---|---|
| 2,343,499 A | 3/1944 | Edwards |
| 4,392,425 A | 7/1983 | Capezzuto et al. |
| 4,466,193 A | 8/1984 | Astle |
| 4,837,942 A * | 6/1989 | Watts ................. B25H 7/04 33/574 |
| 5,927,919 A | 7/1999 | Blankenship et al. |
| 6,360,661 B1 * | 3/2002 | Cheung ................ B41K 1/50 101/333 |
| 6,574,880 B2 | 6/2003 | Lombardo |
| 6,908,270 B1 | 6/2005 | Iwata |
| 6,952,887 B2 | 10/2005 | Muchnik |
| 6,971,184 B2 | 12/2005 | Prevost |
| 6,978,551 B2 | 12/2005 | Krake et al. |
| 6,983,691 B2 * | 1/2006 | Shih ................. B41K 1/56 101/103 |

(Continued)

OTHER PUBLICATIONS

Sep. 2, 2013 Internet Archive screen capture of E-VisionUK Hotel Solutions web page for Keyhole Brackets.

(Continued)

*Primary Examiner* — Todd M Epps
(74) *Attorney, Agent, or Firm* — Lance M. Pritikin

(57) ABSTRACT

A marking apparatus and its method of use facilitate blind slide-mounting of an object to a mounting surface in a desired alignment using the object as an alignment template. The apparatus includes a post element, a retention element, a tightening element and a cover. The retention element is movable against resilient bias to allow the apparatus to capture a mounting slot in the object. The resilient bias moves the retention element to a gripping position, and the cover can be rotated so as to cause the tightening element to secure the grip of the apparatus to the object. When the object is aligned with and pushed toward the mounting surface, the cover moves against an elastic bias to allow a marking end of the apparatus to contact the mounting surface so as mark the appropriate location for installation of a fastener to supportingly engage the slide-mount slot of the object.

24 Claims, 22 Drawing Sheets

(56) References Cited

U.S. PATENT DOCUMENTS

| | | |
|---|---|---|
| 7,293,925 B1 | 11/2007 | Sanseviero |
| 8,458,979 B2 | 6/2013 | Ebner et al. |
| 2002/0083612 A1 | 7/2002 | Prather |
| 2004/0098875 A1 | 5/2004 | Gould |
| 2008/0315063 A1 | 12/2008 | Gallien |
| 2009/0193674 A1 | 8/2009 | Megahed |
| 2011/0174953 A1 | 7/2011 | Ruiz et al. |
| 2015/0034794 A1 | 2/2015 | Durante |
| 2015/0144756 A1 | 5/2015 | Miller |

OTHER PUBLICATIONS

Oct. 24, 2014 Internet Archive screen capture of Home Depot web page for 20 lb. Large Keyhole Hangers, Model # 50236.
Mar. 12, 2015 Internet Archive screen capture of Parts Express web page for Keyhole Speaker Hanging Kit, Hangman Model KSH4-B.

* cited by examiner

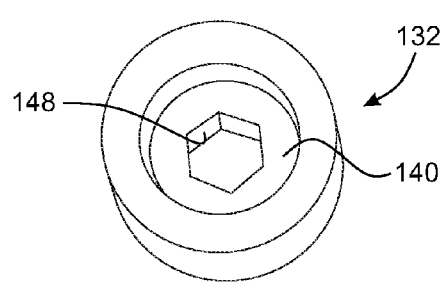
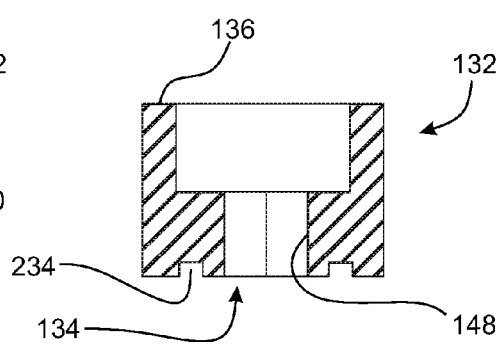
FIG. 4    FIG. 5
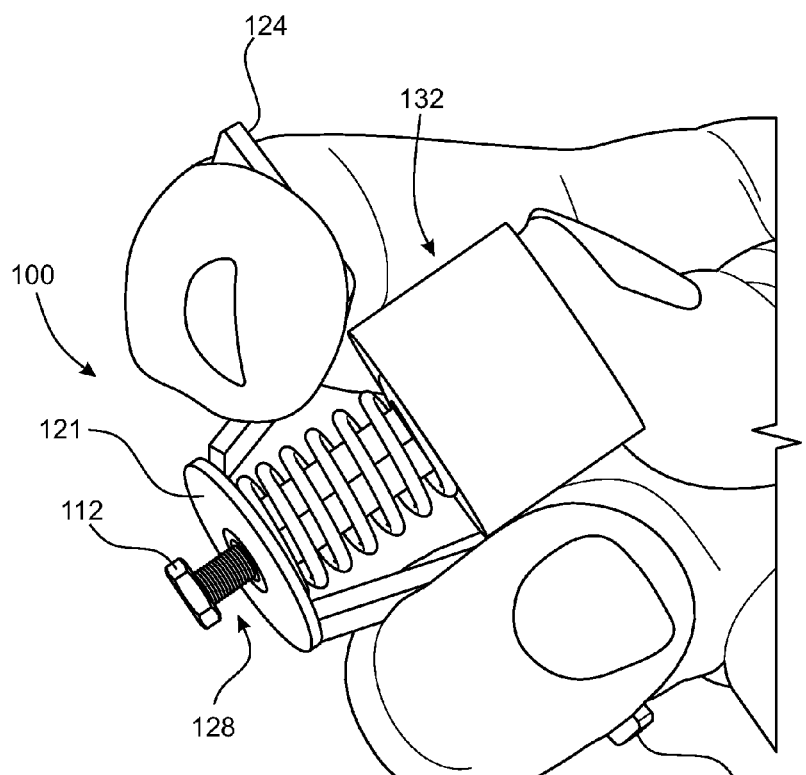
FIG. 6

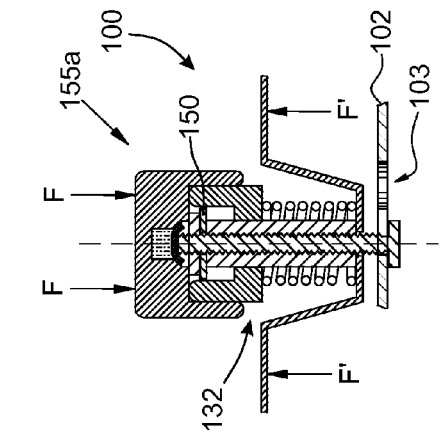
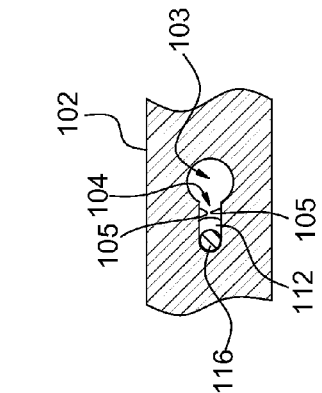
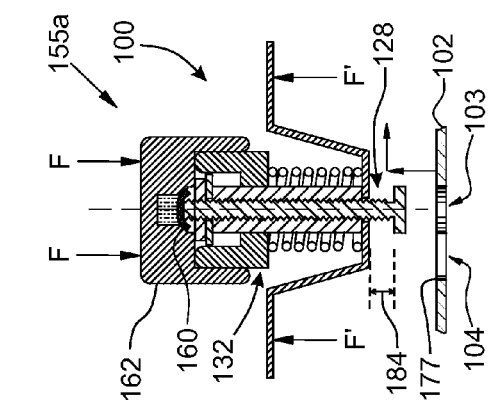
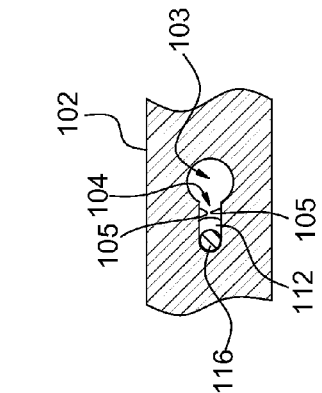
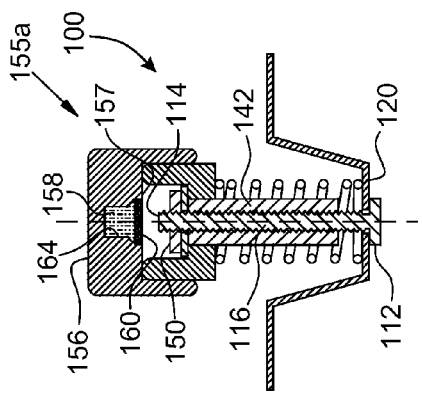
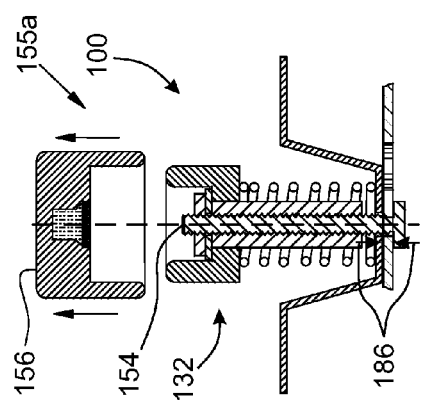

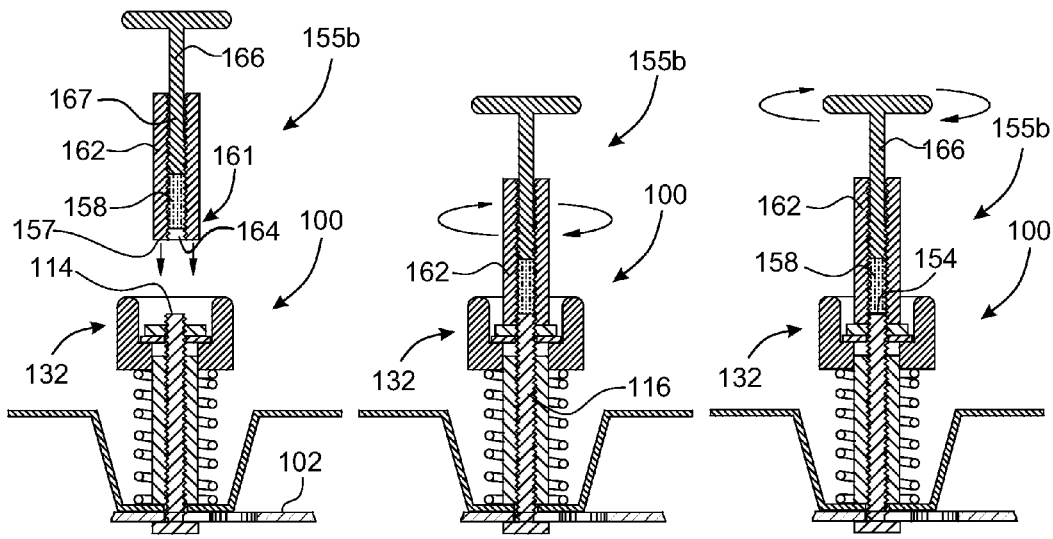
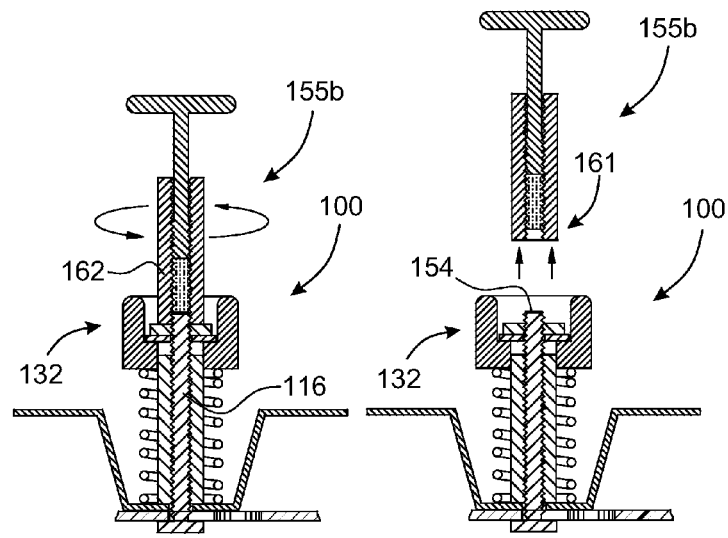
FIG. 18  FIG. 19  FIG. 20
FIG. 21  FIG. 22

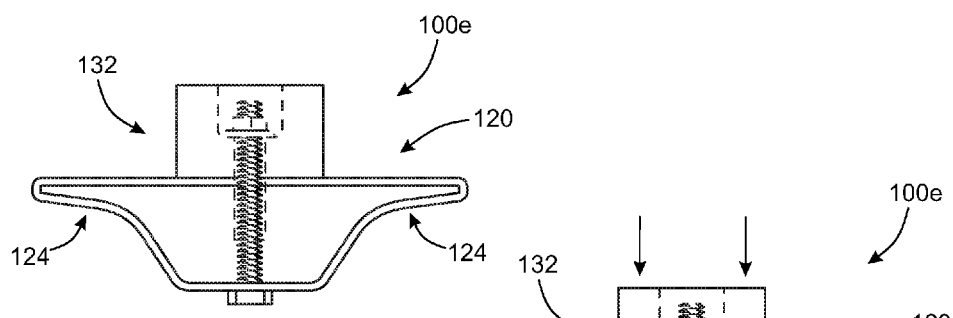
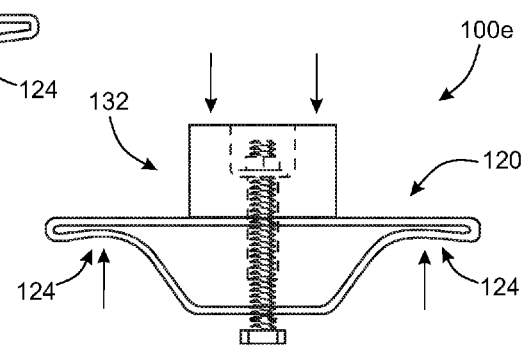
FIG. 36
FIG. 37
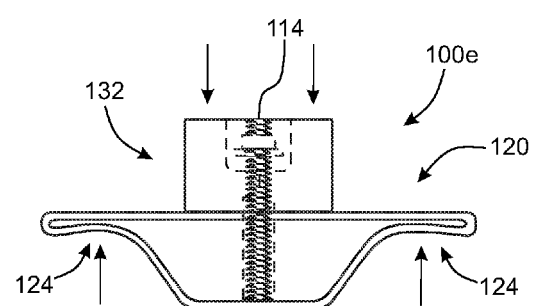
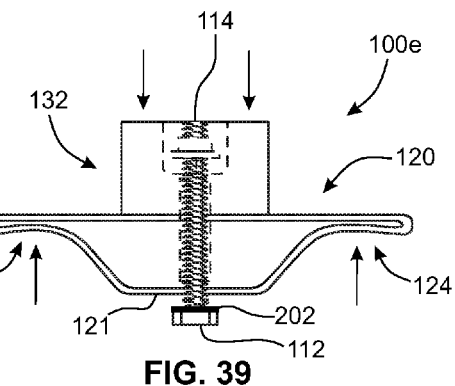
FIG. 38
FIG. 39
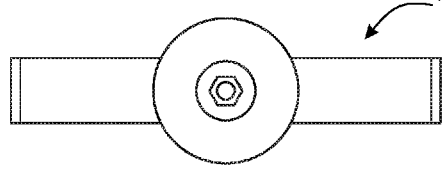
FIG. 40

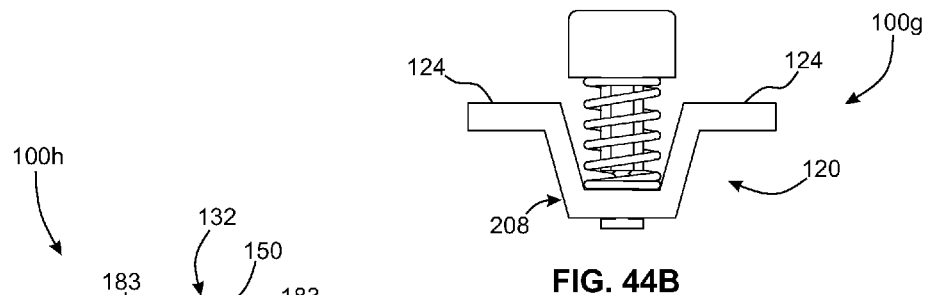
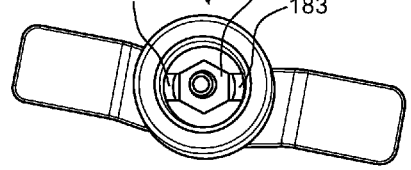
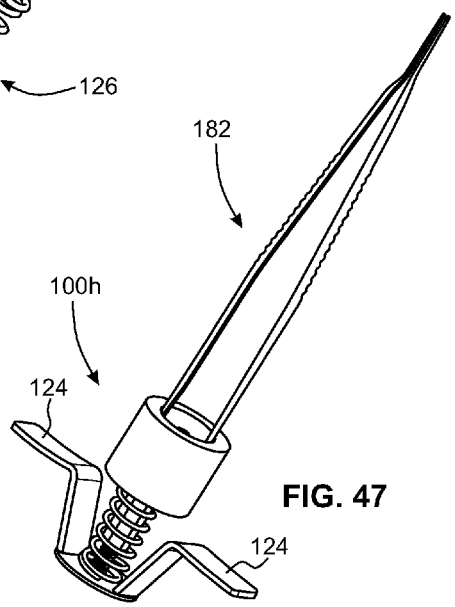

BLIND SLIDE-MOUNT FASTENER ALIGNMENT APPARATUS, KIT AND METHOD

RELATED APPLICATIONS

This application is a U.S. bypass continuation of International Patent Application No. PCT/US2016/053208 having an international filing date of Sep. 22, 2016, which claims the benefit of U.S. Provisional Application No. 62/222,091 filed Sep. 22, 2015. Each of the above-identified applications is hereby incorporated by reference in their entireties as though fully and completely set forth herein.

TECHNICAL FIELD

The disclosure herein relates generally to devices and methods for mounting objects onto supporting structures. More particularly, the disclosure relates to devices and methods to facilitate placement of slide-mount fasteners on a supporting wall or other structure in a manner which results in desired alignment of the mounted object.

BACKGROUND

Many objects feature one or more blind slide-mount expedients, such as keyholes, to enable attachment of the object to a surface such as a wall, underside of a desk, inside of a cabinet, and the like. Each such expedient is generally adapted to receive a portion of a fastener extending outward of the surface to which the object is removably mounted. Alignment of such fasteners on the mounting surface is typically accomplished by using either a mount-hole template or by manually measuring, in the case of two or more slide-mounts, the distance between the object slide-mounts.

While a template provides good accuracy, there are often cases where an object needs to be re-mounted and the original template is no longer available or the manufacturer never provided a template in the first place. This generally results in the need to develop a new template via drawing or copy machine, or use of measurements, in the case of two or more slide-mounts requiring the distance-between-holes measurement method.

The distance-between-holes method is tedious and prone to error, particularly if in areas difficult to see/reach. And if the mount holes on the attachment surface are off even slightly, the object will fail to mount.

Further, neither of the aforementioned conventional methods takes into account the physical 3-dimensional characteristics of the object to be mounted, or to other nearby items that can affect the object's fit or appearance once the object is mounted. By way of example for the former, take the case of a power strip that has its power cord extending from one end. If this is not taken into account during the fastener alignment process, the fastener locations can result in the power strip not being mountable because the power cord would interfere with a nearby obstruction. As an example of the latter, the mount holes may be located to be perfectly level, but a nearby object that is not perfectly level may result in an undesirable mounted appearance.

There are also many objects, such as certain picture frames, that do not come with any mount system, or come with a mount system that requires measurement. And for objects with a single mounting point (e.g., picture wire), there is the continuous battle with being "crooked". Keyhole mount adaptors are available to be affixed to an object for mounting, the use of 2 which would be beneficial for an always-hanging-as-mounted outcome. However, they are typically not used. The reason has to do with the critical nature of placement of the adapter(s) and associated difficulty in accurately determining the mounting hardware locations; for two or more add-on adapters it is extremely difficult to get the mount hole locations correct, leading to the potential for the object to hang with some amount of permanent undesired angle. Additionally, conventional keyhole mount adaptors have a single linear slot which leaves the mounted object susceptible to dismounting from the mounting surface by uniaxial movement of the object, caused by an earthquake or the like. Depending upon the mounting location, the resulting falling object may present a significant risk to personal safety or damage to the object.

What is needed is an inexpensive, reliable, and easy-to-use apparatus, kit and method to facilitate the aligned mounting of objects having keyhole or other slide mount features. What is also needed is an improved keyhole or other slide mount adapter which can be affixed to an object and which significantly reduces the chance of that object becoming dismounted as a result of random movement of the object or mounting surface.

SUMMARY

Certain deficiencies of the prior art are overcome by the provision of embodiments of an apparatus, kit and method in accordance with the present disclosure. Advantages of embodiments of the teachings disclosed herein include providing an apparatus that (a) securely tightens to the object to ensure mounting accuracy, regardless of the materials the object is made of, (b) functions on virtually all blind slide-munt configurations, and (c) avoids making undesirable marks on the mounting surface while positioning the object to be mounted.

BRIEF DESCRIPTION OF THE DRAWINGS

Further advantages of the present invention may become apparent to those skilled in the art with the benefit of the following detailed description of the preferred embodiments and upon reference to the accompanying drawings in which:

FIG. 4 is a diagrammatic perspective view of an example cover element in accordance with certain embodiments of a marking apparatus disclosed herein;

FIG. 5 is a diagrammatic cross-sectional view of the example cover element shown in FIG. 4;

FIG. 6 is a diagrammatic perspective view of an example marking apparatus in which the object retention element has been moved to its open position, thereby presenting a lip groove between the object retention element and head portion of the post element;

FIG. 12 is a diagrammatic cross-sectional view of an example apparatus in accordance with the present disclosure, further including one example of a cap-style marking tip applicator, the marking apparatus being shown with the object retention element in its closed position and the cover element in its extended position;

FIG. 13 is a diagrammatic cross-sectional view similar to that of FIG. 12, but in which the with the object retention element in its open position;

FIG. 14 is a diagrammatic cross-sectional view similar to that of FIG. 13, but in which the head portion of the post element has been inserted through fastener head opening of a mounting slot of the object;

FIG. 15 is a diagrammatic cross-sectional view of the apparatus of FIG. 14, but showing the object retention element in a gripping position and the tightening element in its release position;

FIG. 16 is a diagrammatic cross-sectional view similar to that of FIG. 15, but shoeing the cover element being rotated to threadingly transport the tightening element to its lock or retaining position so as to clampingly secure the object slot lips between the head portion and the object retention element;

FIG. 17 is a diagrammatic cross-sectional view taken across lines 17-17 of FIG. 16;

FIG. 18 is a diagrammatic cross-sectional view of an example marking apparatus and plunger-style marking applicator;

FIG. 19 is a diagrammatic cross-sectional view of an example apparatus and plunger-style marking applicator of FIG. 18, wherein the applicator body is being threadedly secured to the post element proximate its marking end;

FIG. 20 is a diagrammatic cross-sectional view of an example apparatus and plunger-style marking applicator of FIG. 18, wherein the plunger element is being threadedly actuated inwardly through the applicator body, thereby forcing a patch of marking substance onto marking end;

FIG. 21 is a diagrammatic cross-sectional view of an example apparatus and plunger-style marking applicator of FIG. 18, wherein the applicator body is being threadedly removed from the post element;

FIG. 22 is a diagrammatic cross-sectional view of an example apparatus and plunger-style marking applicator of FIG. 18, wherein the applicator has been separated from the marking apparatus after having applied marking substance to the marking tip of the apparatus;

FIG. 36 is a diagrammatic cross-sectional view of yet another example embodiment of a marking apparatus in accordance with the present disclosure, wherein the resilient bias of the object retention element and the elastic bias of the cover element are provided by the object retention element;

FIG. 37 is a diagrammatic cross-sectional view similar to that of FIG. 36, but in which the object retention element is moved to its open position by elastic compression of the object retention element;

FIG. 38 is a diagrammatic cross-sectional view similar to that of FIG. 36, but in which the cover element has been moved into its marking position by elastic compression of the object retention element;

FIG. 39 is a diagrammatic cross-sectional view similar to that of FIG. 36, but in which the object retention element has been moved to its open position and the cover element has been moved into its marking position by elastic compression of the object retention element;

FIG. 40 is a diagrammatic top plan view of the marking apparatus of FIG. 36;

FIG. 44B is a diagrammatic side view of a marking apparatus which functions similarly to than of FIG. 41, but wherein the spacer element is integrally formed with the object retention element and made from a resilient material;

FIG. 45 is a diagrammatic perspective view of yet another example embodiment of a marking apparatus in accordance with the present disclosure, wherein the cover retention detent includes a pair of opposingly-disposed torque engagement grooves for engagement by a torqueing tool;

FIG. 46 is a diagrammatic exploded view the embodiment of the marking apparatus shown in FIG. 45;

FIG. 47 is a diagrammatic perspective view of the marking applicator of FIG. 46, including a set of household tweezers being used as a torqueing tool engaging the torque engagement slots of the cover retention detent, thereby enabling the user to further inhibit or prevent rotation of the post element while rotating the cover element;

DETAILED DESCRIPTION OF THE PREFERRED EMBODIMENTS

Figure 1:
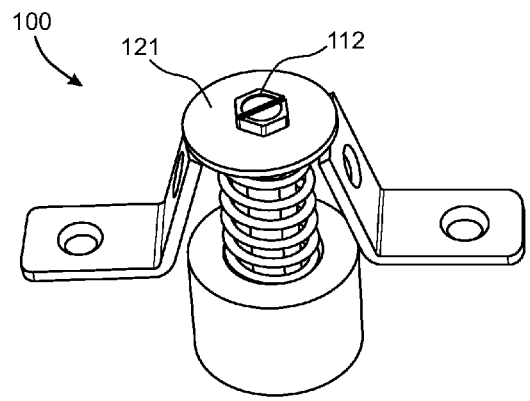
FIG. 1 is a diagrammatic perspective view of one example marking apparatus in accordance with the present disclosure.
Figure 2:
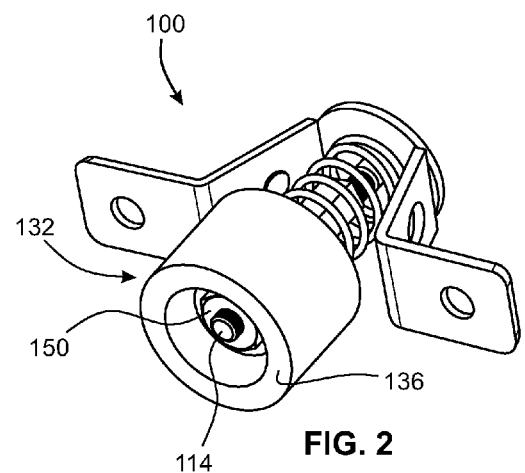
FIG. 2 is a further diagrammatic perspective view of the marking apparatus of FIG. 1.
Figure 3:
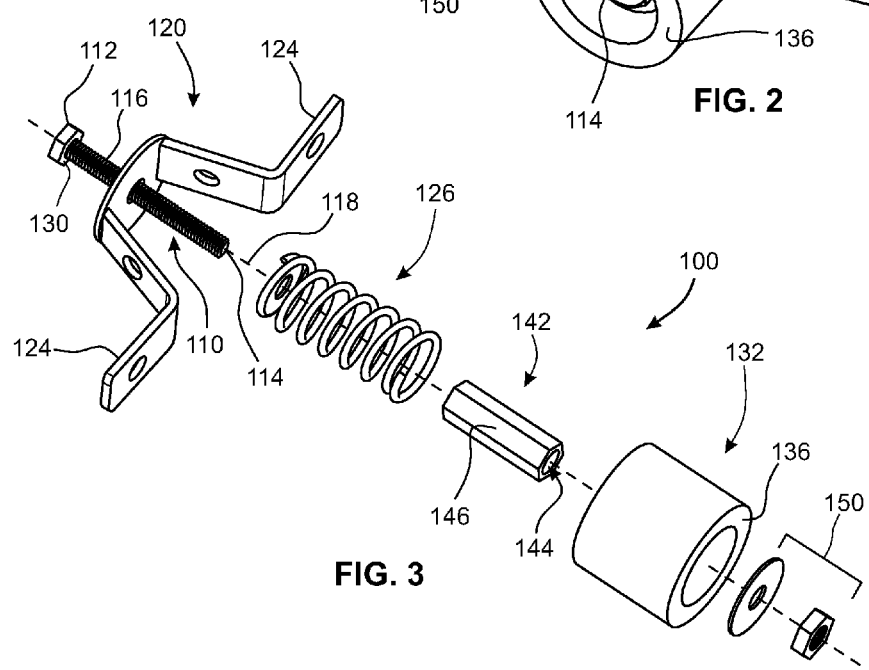
FIG. 3 is a diagrammatic exploded view of the marking apparatus of FIG. 1.
Figure 7:
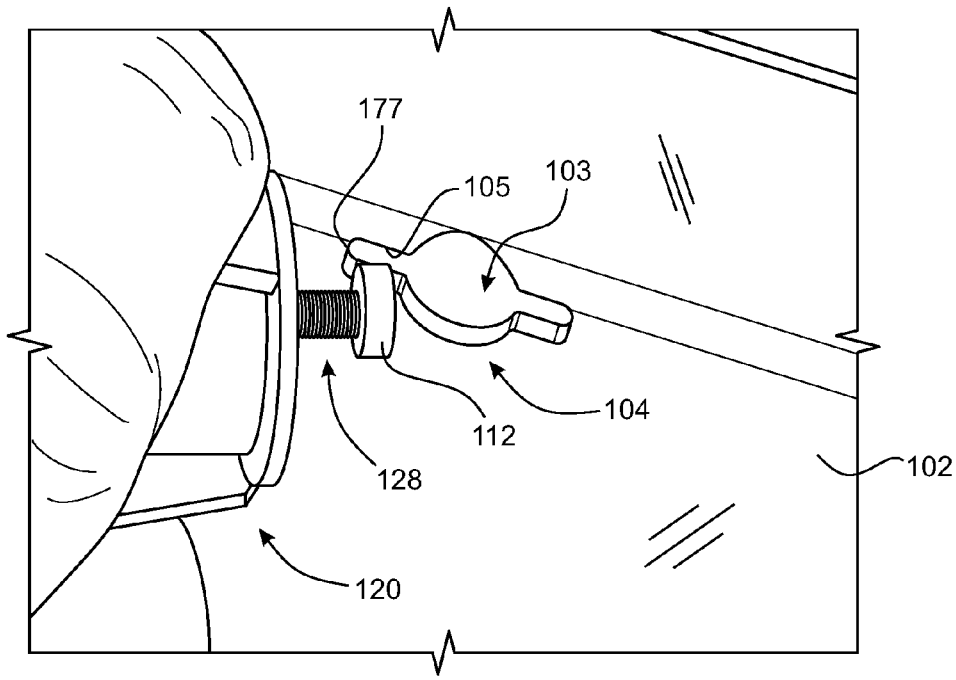
FIG. 7 is a diagrammatic partial perspective view illustrating the insertion of the head portion of the post element into a mounting slot of an object while the object retention element in is its open position.

Referring now to the drawings, like reference numerals designate identical or corresponding features throughout the several views.

With reference to the several drawings, embodiments of a marking apparatus for facilitating blind slide-mounting of an object 102 to a mounting surface 108 in a desired alignment using the object as an alignment template are shown generally at 100. Certain alternate embodiments of a marking apparatus 100 are shown at reference characters 100*a*-100*j*.

Embodiments of a marking apparatus in accordance with the present disclosure may preferably comprise a post element 110, an object retention element 120, a tightening element 142 and a cover element 132. The post element 110 may include a head portion 112, a marking end 114 and a shaft portion 116 typically extending therebetween along a main axis 118. The shaft portion 116 may be at least partially threaded.

The object retention element 120 may have a retention face 121, a post aperture 122 through which the post element may extend, and be movable with respect to the post element 110 along the main axis 118 between a closed position (see, for example, FIGS. 1, 28, 32, 34, and 36), an open position (see, for example, FIGS. 6 and 13), and a gripping position therebetween (see, for example, FIGS. 15 and 16). The object retention element 120 may be resiliently biased toward the closed position. With reference to FIGS. 6, 7, 13 and 44, movement of the object retention element 120 from the closed position to the open position preferably results in the presentation of a lip groove 128 for receiving a mounting lip 105 of an object 102. With reference to FIG. 13, the lip groove 128 may be at least partially defined by a gap distance 184 between the head portion 112 and the object retention element 120. Referring to FIG. 15, movement of the object retention element 120 from the open position to the gripping position results in a reduction of the gap distance for securement of the mounting lip 105 within the lip groove 128 with a gripping force 186.

Figure 24:
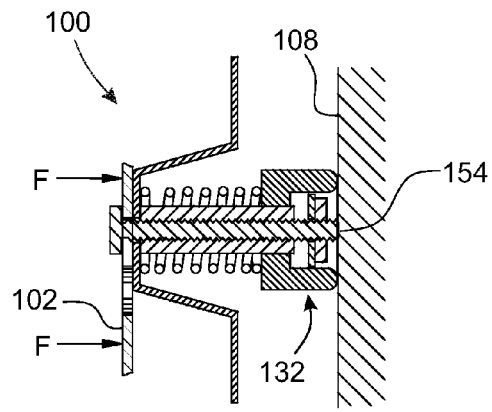
FIG. 24 is a diagrammatic cross-sectional view of the apparatus of FIG. 21, but shown in a sixth configuration in which the cover element is forced into its retracted position by pushing the object toward the mounting surface, thereby causing the marking tip to place a respective patch of marking substance on the mounting surface.

Referring to FIGS. 15 and 16, the tightening element 142 may have a main bore 144 which may be threaded, and a first torque detent non-rotatably engageable with a second torque detent 148 of the cover element 132. The tightening element may be threadedly transportable along the shaft portion 116 between a release position and a lock position. As a result, with reference to FIGS. 12 and 13, the tightening element 142 may be configured such that when in its release position, it allows movement of the object retention element 120 between the closed position and the open position. Further, with reference to FIG. 16, when in the lock position, the tightening element 142 may be configured to prevent movement of the object retention element 120 from the gripping position toward the open position. Moreover, as is apparent from FIGS. 15 and 16, the threadable transportability of the tightening element enables adjustability of the gripping force 186 generated between the head portion 112 and the object retention element 120. The adjustability of the gripping force 186 preferably enables the gripping force to be increased sufficiently so as to rigidly affix the marking apparatus to the object 102. With reference to FIG. 24, such rigidity helps ensure that the respective marking 154 is placed at the proper location on the mounting surface 108.

Figure 23:
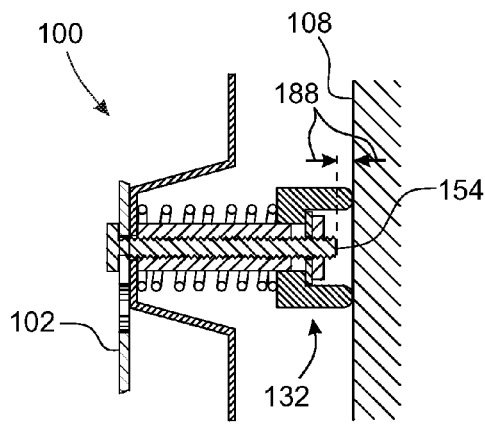
FIG. 23 is a diagrammatic cross-sectional view of the marking apparatus of FIG. 12, but shown in a configuration in which the cover element is in its extended position and is positioned against the mounting surface prior to marking.

The cover element 132 may have a tightening element aperture 134, a marking tip chamber 138 and a lock detent 140. The cover element 132 may be configured to engage the tightening element 142 so as to restrict relative rotational movement therebetween about the main axis 118 while enabling relative axial movement therebetween. In particular preferred embodiments of a marking apparatus, the cover element 132 may include a surface engagement portion 136 and be movable with respect to the post element 110 along the main axis 118 between an extended position (see, for example, FIG. 23) and a marking position (see, for example, FIG. 24). As shown in FIG. 23, in certain preferred embodiments of a marking applicator 100, by definition the surface engagement portion 136 extends axially beyond the marking end 114 when the cover element 120 is in the extended position. Relatedly, as illustrated in FIG. 24 for example, by definition the surface engagement portion 136 may be substantially axially aligned with or inward of the marking end 114 when the cover element 120 is in the marking position.

The object retention element 120 may include one or more finger grip portions 124, preferably extending radially of the main axis 118.

In particular preferred embodiments of a marking apparatus 100, the cover element 132 may be elastically biased toward its extended position. Such elastic bias may be by way of, for example, a spring element 126 or the like. In certain preferred embodiments of a marking apparatus 100, the resilient bias of the object retention element 120 and the elastic bias of the cover element 132 may both be provided by the same spring element 126. Additionally, or in the alternative, with reference to FIGS. 36-39 for example, the resilient bias and elastic bias may be provided by way of the object retention element 120. In such case, the object retention element 120 may be comprised of a spring steel or resilient polymer, and may have a closed-profile cross-section.

Figure 11:
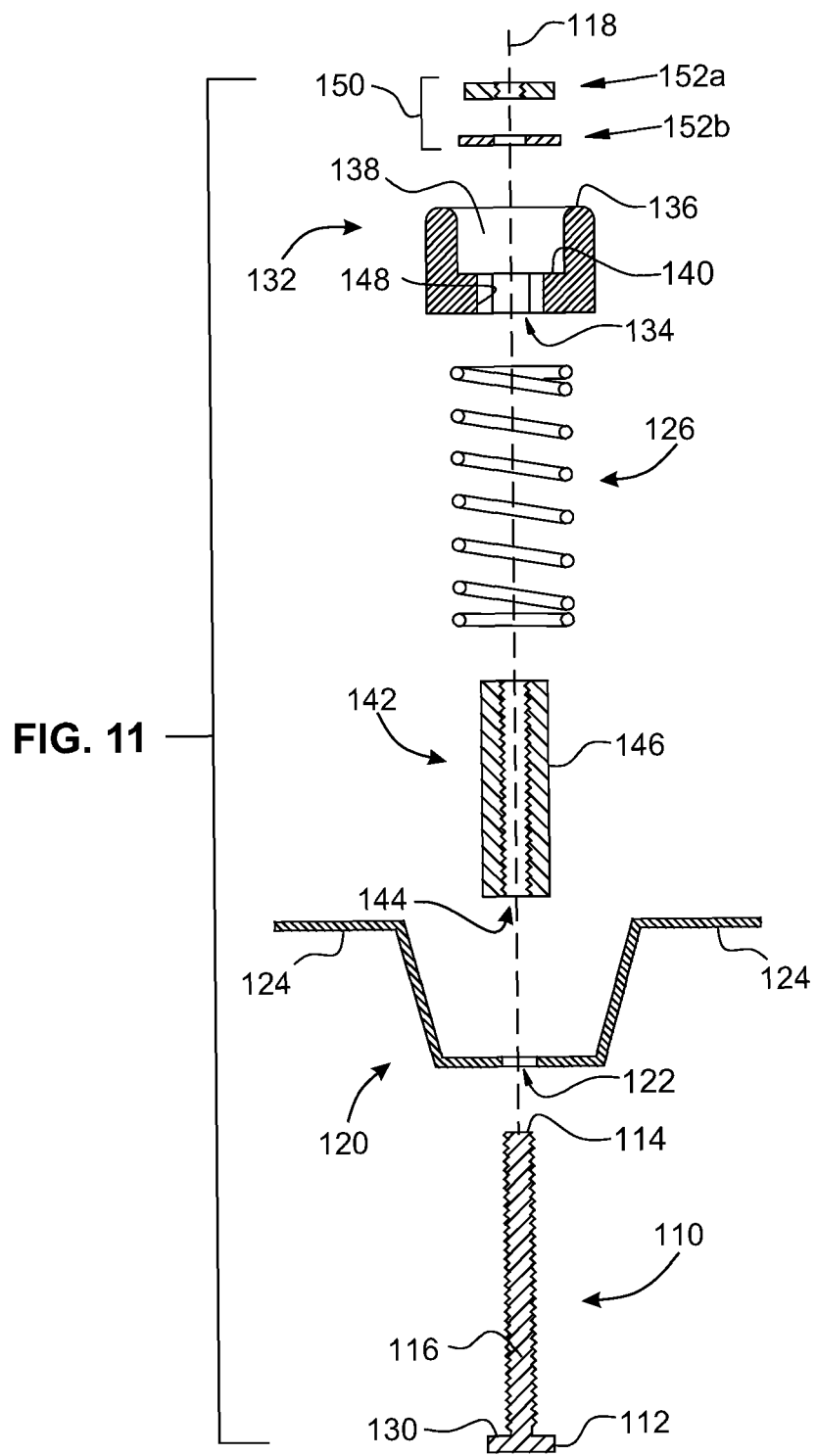
FIG. 11 is a diagrammatic cross-sectional view of the example marking apparatus shown in FIG. 3.
Figure 35:
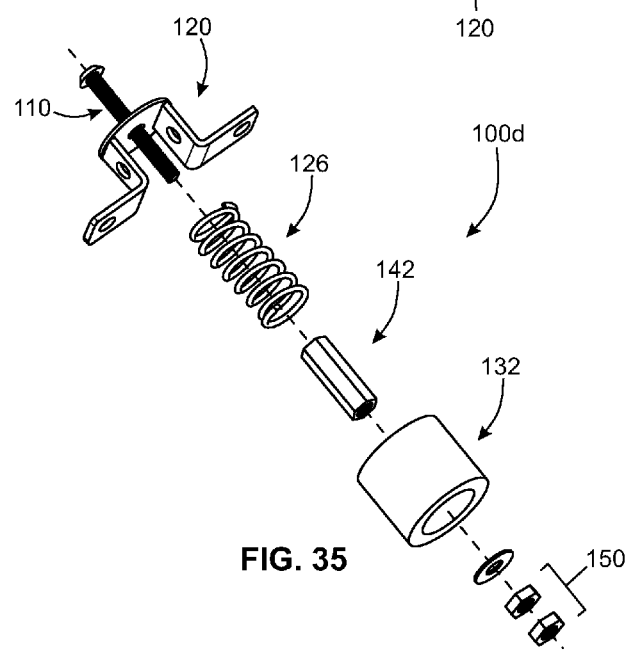
FIG. 35 is a diagrammatic exploded view of the example embodiment of FIG. 34.
Figure 41:
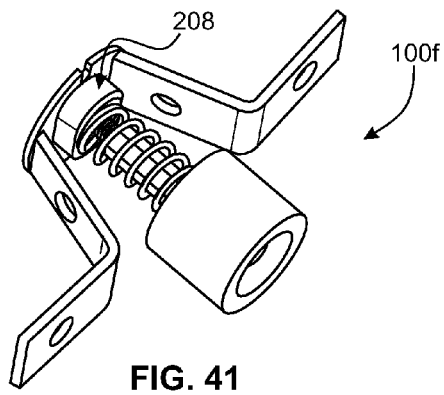
FIG. 41 is a diagrammatic perspective view of yet another example embodiment of a marking apparatus in accordance with the present disclosure, wherein the post element includes a rotational detent member and the marking apparatus includes a spacer element.
Figure 43:
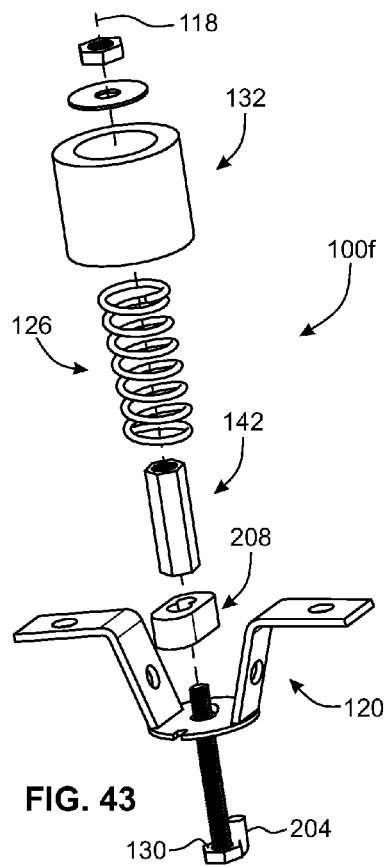
FIG. 43 is a diagrammatic exploded view of the example embodiment of FIG. 41.
Figure 42:
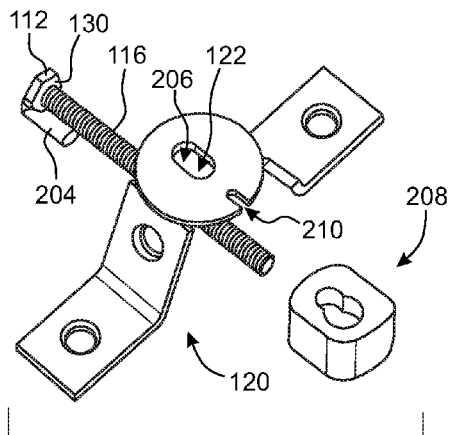
FIG. 42 is a diagrammatic view of a post element, retention element and spacer element of the embodiment of the marking apparatus shown in FIG. 41.

Particular preferred embodiments of a marking apparatus 100 may further comprise a cover retention detent 150 affixed to the post element 110. With reference to FIGS. 11, 35 and 43, the cover retention detent 150 may include, for example one or more lock nuts 152*a* and one or more washers 152*b*. With reference to FIGS. 12 and 23, the cover retention detent 150 may be configured to axially retain the cover element 132 on the post element 110, and may limit the axial distance 188 between the surface engagement portion 136 and the marking end 114 when the cover element 132 is in its extended position. The cover retention detent 150 may be non-rotatably secured to the post element 110, and configured to be engaged by a torqueing tool 182 (such as, for example, a wrench) in order to prevent rotation of the post element 110 while the cover element 132 is bring rotated to move the tightening element 142 to its lock position. In certain embodiments of a marking apparatus, such as the one shown in FIGS. 45-47, the cover retention detent 150 may include one or more torque engagement grooves 183 for engagement by the torqueing tool 182. The torque engagement grooves 183 may be, for example, a pair of opposingly-disposed grooves such as those shone in FIG. 45, thus enabling the convenient use of common household objects such as tweezers as a torqueing tool 182.

Figure 32:
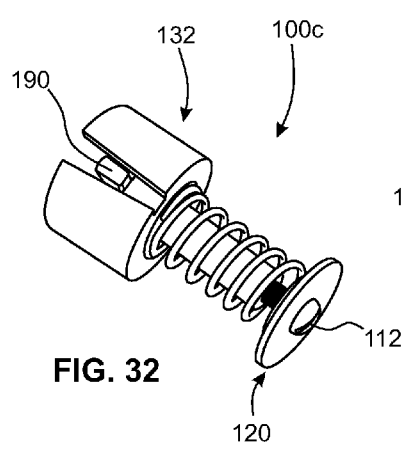
FIG. 32 is a diagrammatic perspective view of yet another example embodiment of a marking apparatus in accordance with the present disclosure.
Figure 33:
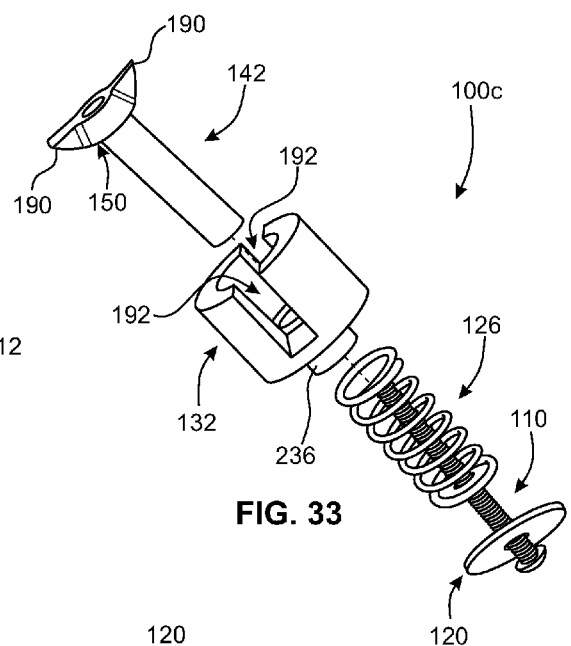
FIG. 33 is a diagrammatic exploded view of the example embodiment of FIG. 32.
Figure 34:
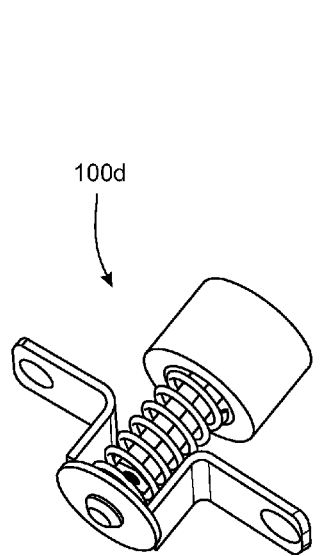
FIG. 34 is a diagrammatic perspective view of yet another example embodiment of a marking apparatus in accordance with the present disclosure.

With reference to FIGS. 32 and 33, in an embodiment of a marking apparatus 100*c* the tightening element 142 may include at least one radially-extending alignment member 190, and the cover element 132 may include at least one axially-extending slot 192 for axially-slidable receipt of the at least one alignment member 190. Such a configuration may provide the aforementioned restriction in relative rotational movement between the tightening element 142 and the cover element 132 about the main axis 118, and the aforementioned enablement of relative axial movement between the tightening element 142 and the cover element 132.

With reference to FIGS. 12, 18, and 67-72, a marking apparatus may further comprise a marking applicator (for example, 155*a* and 155*b*) including an applicator body 162 having a distal end 156, a delivery portion 161, and a reservoir 164 therebetween. The reservoir 164 may contain a marking substance 158. The delivery portion 161 may be configured to engage the post element 110 for depositing a marking patch 154 of the marking substance 158 to the marking end 114. As illustrated for example in FIGS. 12-22, the applicator body 162 may be removably securable to the cover element 132. As illustrated in FIGS. 13-15, in a cap configuration of the marking applicator 155*a*, when the cover element 132 is moved toward its marking position with the applicator body 162 secured to the cover element 132, the marking applicator 155*a* may be configured to apply a marking patch 154 to the marking end 114.

With reference to FIGS. 18-22, the delivery portion 161 of a marking applicator 155*b* may be adapted to receivingly attach to a segment of the shaft portion 116 at the marking end 114. Such a marking applicator may include a plunger element 166 with a plunger shaft 167 axially actuatably extending into the reservoir 164. Receiving attachment of the delivery portion 161 to the shaft portion 116 may be by way of threaded engagement between the delivery portion 161 and the segment of the shaft portion 116 at the marking end 114. In such embodiments of a marking applicator 155*b*, and the axial actuatability may be by way of threaded engagement between the applicator body 162 and the plunger shaft 167. In an alternate embodiment of a marking applicator with a plunger element, the plunger shaft and the reservoir may be adapted to simply allow non-threaded, axially-slidable movement therebetween.

In certain preferred embodiment of a marking apparatus, the head portion 112 may include a inner face 130 having one or more frictional engagement facets. The one or more facets may be, for example, a rubberized coating 202, a grit, a spike, a lock washer 194 or a knurl, a combination thereof, or the like.

Referring to FIGS. 41-44, in particular preferred embodiments of a marking apparatus 100*f*, the post element 110 may include a rotational detent member 204 disposed laterally of the shaft portion 116. The rotational detent member 204 may be configured to engage the object retention element 120 (for example, at rotational detent groove 206) so as to restrict or prevent rotation of the post element 110 with respect to the object retention element 120 about the main axis 118. Such embodiments may further comprise a spacer element 208 disposed about the shaft portion 116 axially between the object retention element 120 and the tightening element 142. The spacer element 208 may preferably be configured to receive at least a portion of the rotational detent element 204 therein, so as to prevent mechanical interference between the rotational detent element 204 and the tightening element 142.

With reference to FIG. 44B, in particular embodiments of a marking apparatus 100*g* with a rotational detent member 204, the spacer element 208 may be formed integrally with, for example, the object retention element 120. For example, the rotation detent element 120 may be formed of injection molded plastic, and may be shaped so as to have a thicker or deeper drawn section at the location when spacing is required between the axial termination of the rotation detent member 204, and where the rotational detent member may otherwise mechanically engage the tightening element during the operation of the marking apparatus 100*g*.

Figure 44A:
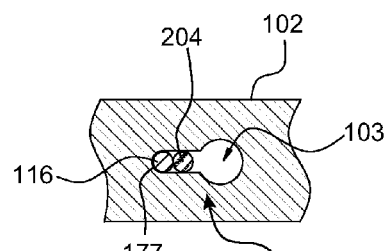
FIG. 44A is a diagrammatic cross-sectional view similar to that of FIG. 17, but illustrating the respective positions of the shaft portion and a rotational detent member of the marking applicator of FIG. 41 with respect to a particular slide-mount slot to which the marking apparatus is secured.
Figure 44:
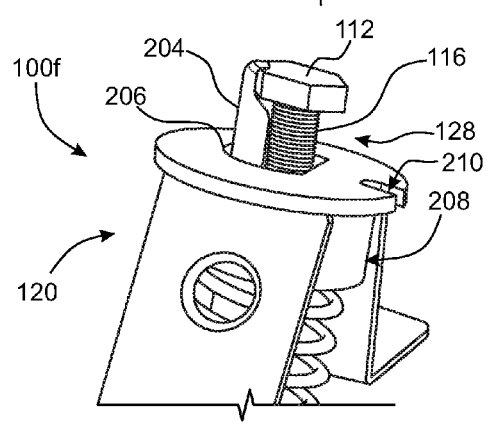
FIG. 44 is a diagrammatic partial magnified view of the lip groove formed when moving the object retention element of the embodiment of FIG. 41 to its open position.

Returning to FIGS. 41-44, in a marking apparatus incorporating a rotational detent member 204, the object retention element 120 may preferably include a visually perceptible rotational orientation indicator 210. This indicator 210 may be located, for example, in the center of the object retention element 120. With reference to FIG. 44A, such an indicator 210 provides the user of the apparatus with an easy outside visual reference to ensure that, when installing the apparatus into a slide mount slot 104, the shaft portion 116 of the post element 110 ends up properly positioned at the closed slot end 177 rather than the rotational detent member 204 being at the closed slot end. One key advantage of embodiments of a marking apparatus incorporating a rotational detent member 204 is that such embodiments are likely to be capable of tightening on all mounting lip materials without requiring frictional engagement between the head portion 112 and the mounting lip 105 of the object 102 in order to prevent rotation of the post element 110.

Figure 56:
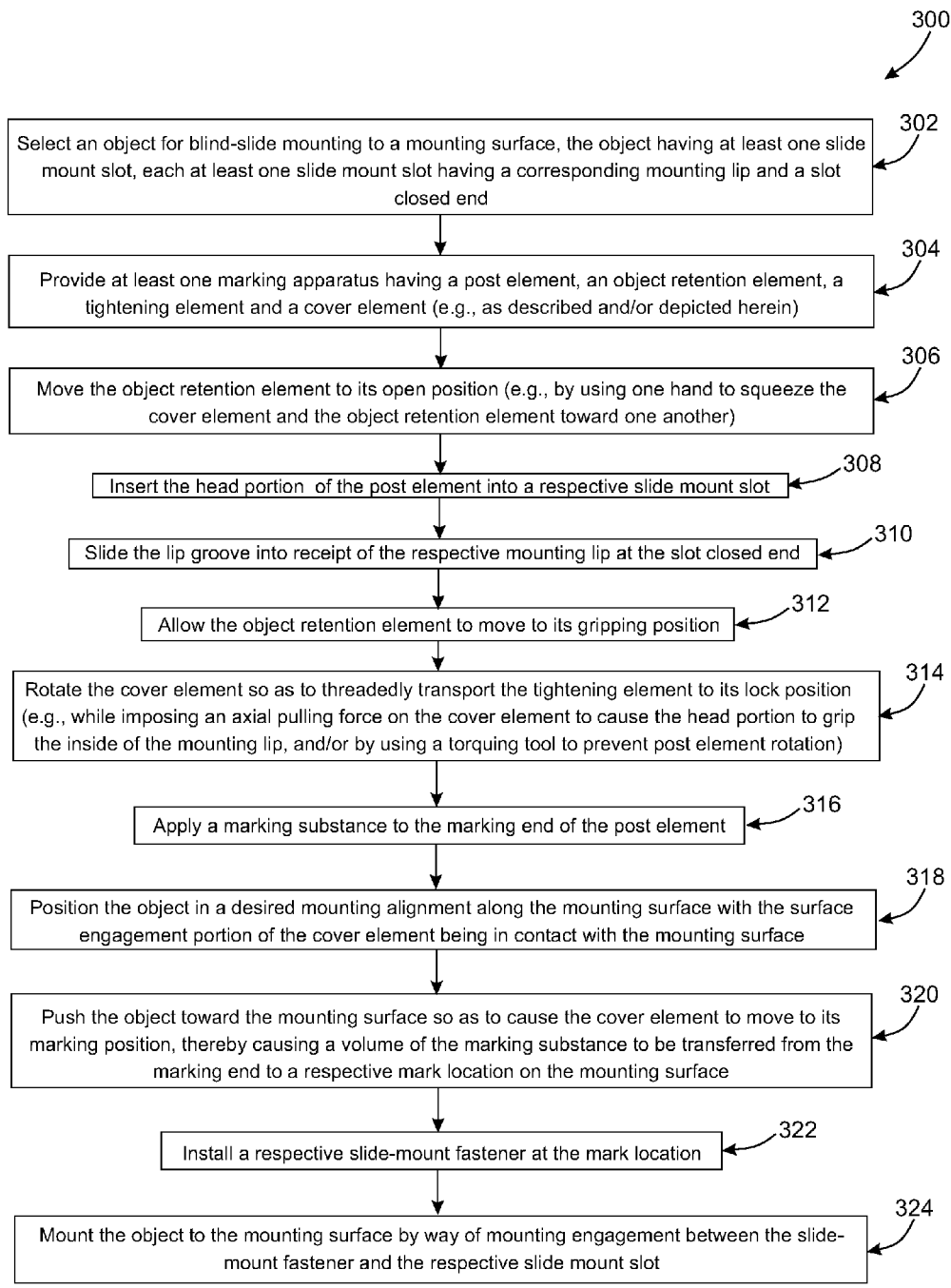
FIG. 56 is a diagrammatic flow diagram illustrating one example embodiment of a method of blind slide-mounting an object to a mounting surface in a desired alignment using the object as an alignment template.

A method of blind slide-mounting an object 102 to a mounting 108 in a desired alignment using the object 102 as an alignment template comprises a series of steps. One example of such a method 300 is illustrated in FIG. 56. Notably, the steps of the methods illustrated and described herein may not need to be performed in any particular order.

Figure 10:
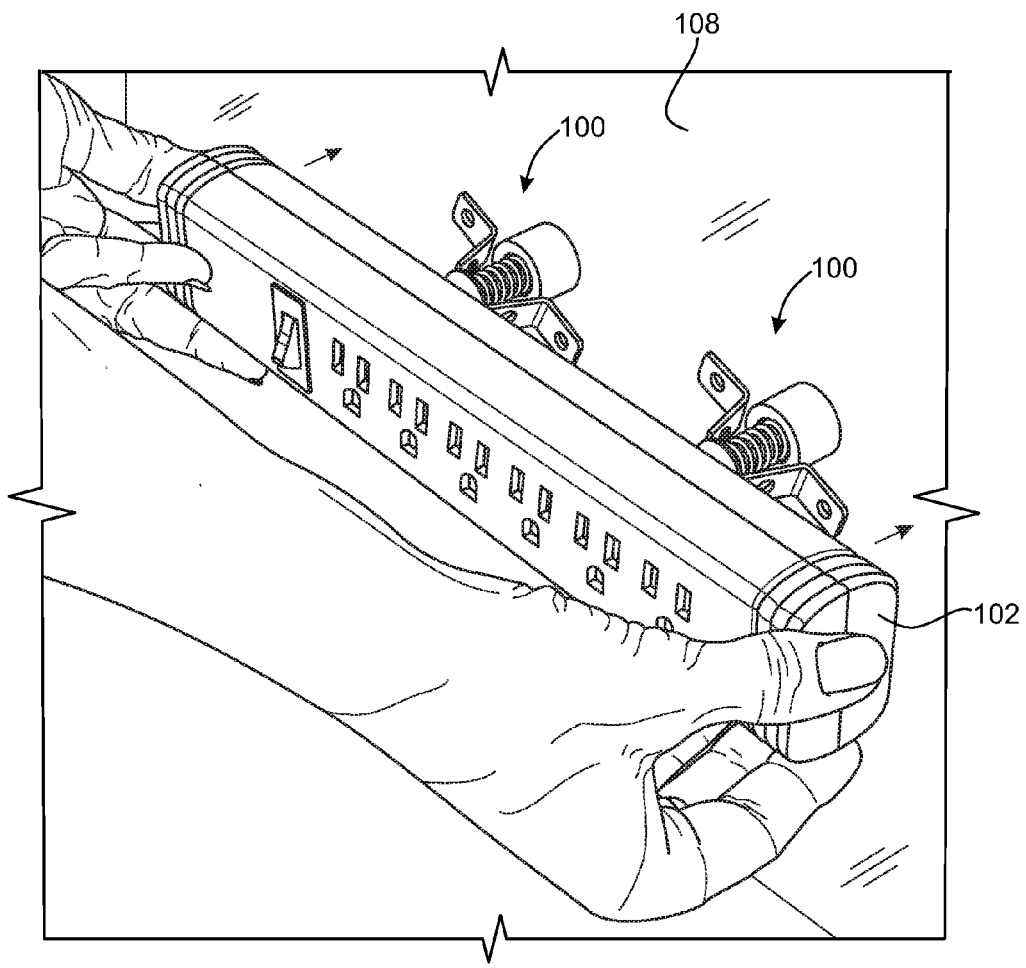
FIG. 10 is a diagrammatic perspective view showing the object being pushed toward the mounting surface so as to cause the cover element of each marking apparatus to move to its marking position, thereby causing a volume of the marking substance to be transferred from the marking end to a respective mark location on the mounting surface.
Figure 25:
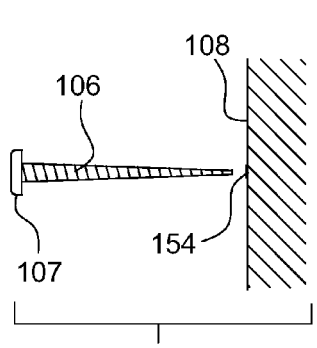
FIG. 25 is a diagrammatic partial cross-sectional view of a mounting surface with an apparatus-placed mark thereon, and a fastener being aligned with the marking for installation thereat.
Figure 26:
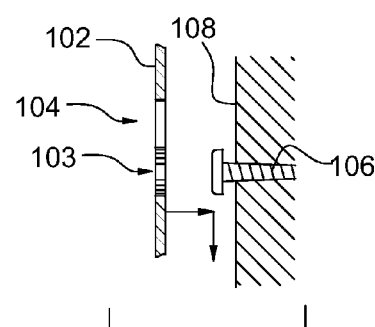
FIG. 26 is a diagrammatic partial cross-sectional view of a mounting surface with a fastener installed therein at the location of an apparatus-placed mark.
Figure 27:
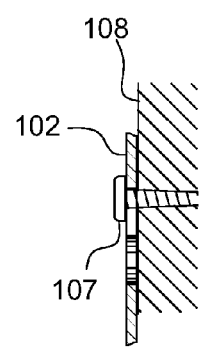
FIG. 27 is a diagrammatic partial cross-sectional view of an object mounted to a mounting surface by way of engagement between the object's keyhole feature and a fastener.
Figure 28:
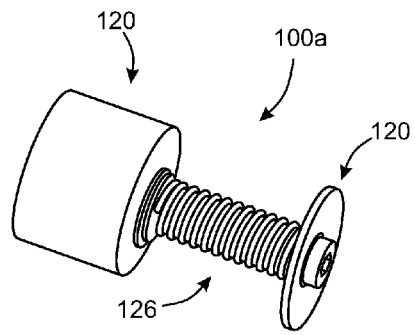
FIG. 28 is a diagrammatic perspective view of another example embodiment of a marking applicator in accordance with the present disclosure.
Figure 29:
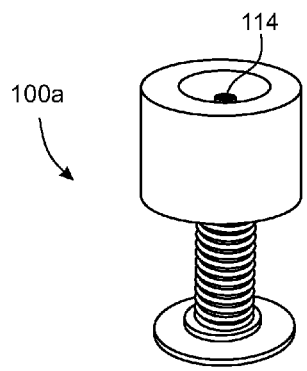
FIG. 29 is a further diagrammatic perspective view of the embodiment shown in FIG. 28.

At block 302, an object 102 is selected for blind-slide mounting to a mounting surface. The object 102 generally has at least one slide mount slot 104. Each slide mount slot 104 has a corresponding fastener head opening 103, mounting lip 105 and a slot closed end 177. At block 304, a marking apparatus is provided. The provided marking apparatus is preferably structurally and functionally consistent with one or more of the apparatuses described and depicted elsewhere in this disclosure. At block 306, the object retention element 120 is moved to its open position (see, for example, FIG. 13). At block 308, the head portion 112 is inserted into a respective slide mount slot 104. At block 310, the lip groove 128 is slid into receipt of the respective mounting lip 105 at the slot closed end 177 (see, for example, FIG. 14). At block 312, the object retention element 120 is allowed to move to its gripping position (see, for example, FIG. 15). At block 314, the cover element 132 is rotated so as to threadedly transport the tightening element 142 to its lock position (see, for example, FIG. 16). At block 316, a marking substance is applied to the marking end 114. At block 318, the object 102 is positioned in desired mounting alignment along the mounting surface 108 with the surface engagement portion 136 being in contact with the mounting surface 108 (see, for example, FIGS. 10 and 23). At block 320, the object 102 is pushed toward the mounting surface 108 so as to cause the cover element 132 to move to its marking position, thereby causing a volume of the marking substance 158 to be transferred from the marking end 114 to a respective mark location on the mounting surface 108 (see, for example, FIG. 24). At block 322 a respective slide-mount fastener 106 is installed at the mark location (see, for example, FIGS. 25 and 26). At block 324, the object 102 is mounted to the mounting surface 108 by way of mounting engagement between the slide-mount fastener 106 and the respective slide mount slot 104 (see, for example, FIG. 27).

In a method such as the one shown at 300, for example, in the step of selecting, the selected object 102 may have two or more said slide mount slots 104. In such case, the step of providing may include providing one or more additional marking apparatuses as described herein; and the remaining steps would be performed in association with all of the marking apparatuses provided.

Referring to FIG. 6, in a method such as the one shown at 300 for example, the step of moving the object retention element 120 to its open position may preferably by achieved by using one hand to squeeze the cover element 132 and the object retention element 120 toward one another with a thumb of the one hand disposed across the surface engagement portion 136 and fingers of the one hand gripping one or more finger grip portions 124 of the retention element 120.

Referring to FIG. 23, in a method such as the one shown at 300 for example, the marking apparatus may further comprise a cover retention detent 150 affixed to the post element 110. In such case, the cover retention detent 150 may (i) axially retain the cover element 132 on the post element 110, (ii) limits the axial distance 188 between the surface engagement portion 136 and the marking end 114 when the cover element 132 is in the extended position, and (iii) be non-rotatably secured to the post element 110. Moreover, when using certain embodiments of the marking apparatus, it may be desirable for the inner face 130 of the head portion 112 to frictionally engage the inside surface of the slide mount slot 104, so as to prevent the post element 110 from rotating while the cover element 120 is being rotated to move the tightening element 142. Certain embodiments of the marking apparatus may provide frictional engagement facets 196 or the like to facilitate this frictional engagement. In such case, the method may further comprise, during the step of rotating, imposing a pulling force 250 on the cover element 132 axially outward of the respective slide mount slot 104.

Figure 8:
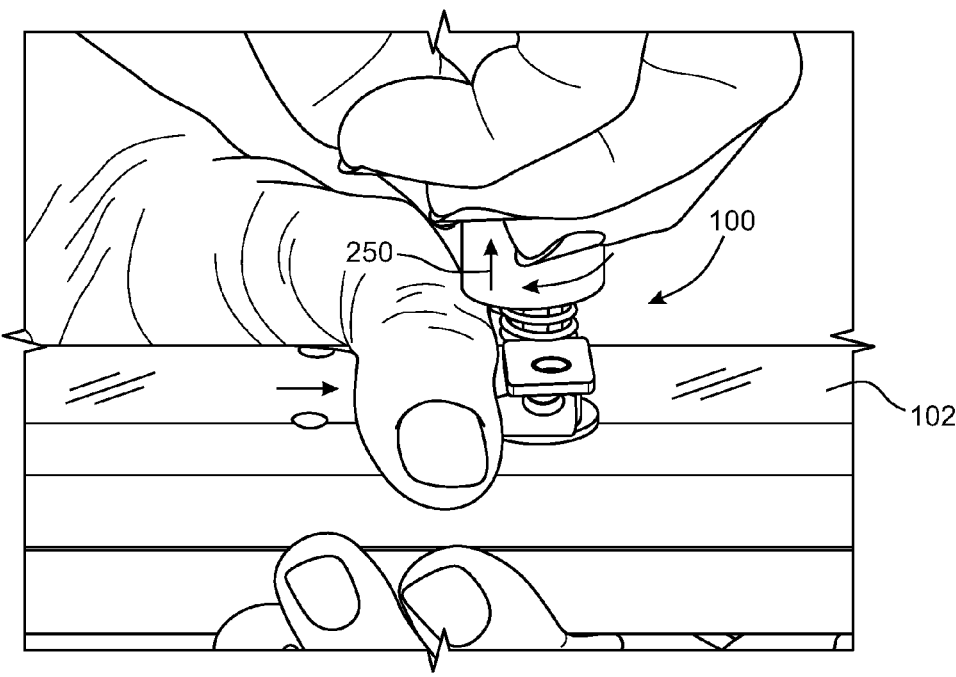
FIG. 8 is a diagrammatic partial perspective view of an example marking apparatus being held so that its shaft portion is maintained at the slot closed end of the fastener slit while the cover element is being rotated to move the tightening element to its lock position.
Figure 9:
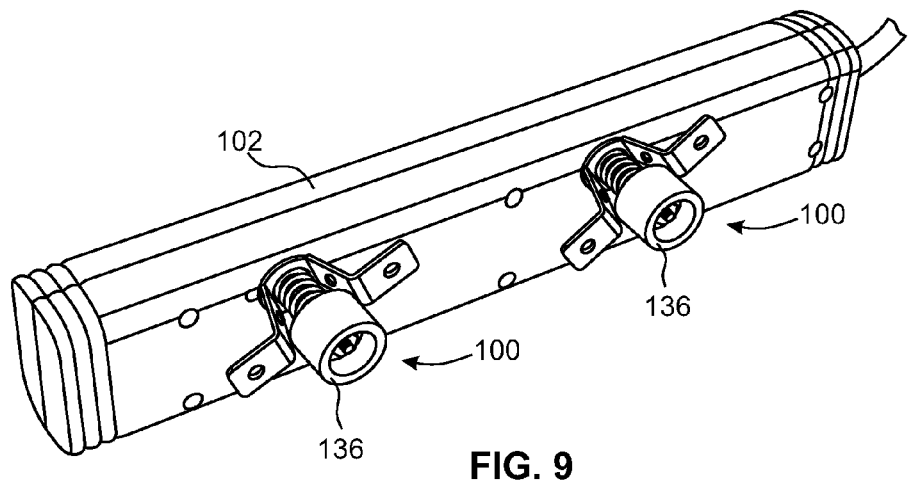
FIG. 9 is a diagrammatic perspective view of an object with a pair of marking apparatuses rigidly affixed thereto, wherein the mounting lip of each mounting slot is secured within the lip groove of a respective marking apparatuses.

In contrast, when the method is being performed using embodiments of a marking apparatus having a rotational detent member 204 (such as, for example, the apparatus 100f shown at FIGS. 41-44), such frictional engagement between the head portion 112 and the inside surface of the slide mount slot 104 may not be necessary to prevent rotation of the post element 110 while the cover portion 132 is being rotated, as the rotational detent member 204 may contact the edge of the mounting lip so as to prevent rotation of the post element 110. See, for example, FIG. 44A. However, if the slot width is great enough, the user may be required to hold the marking apparatus stationary to prevent retention element 120 and hence post element 110 rotation. See, for example, FIG. 8, wherein the user's thumb is pressing against the marking apparatus while the user is rotating the cover element 132 to rigidly tighten the marking apparatus 100f to the object 102. For all embodiments, the apparatus 110 may be required to be held toward the slot closed end 177 while rotating the cover element 132 in order to prevent the post element 110 from walking outward of the slide mount slot.

Figure 50:
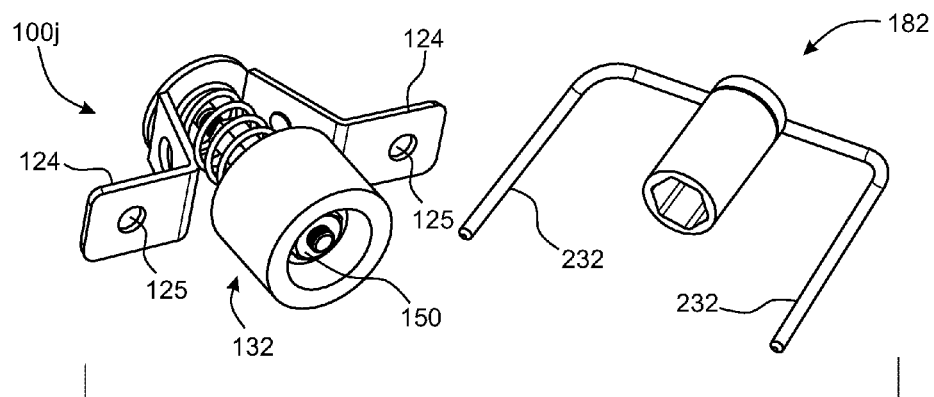
FIG. 50 is a diagrammatic perspective view of yet another example embodiment of a marking apparatus and torqueing tool in accordance with the present disclosure, wherein the torqueing tool includes one or more torsion lock arms engageable with grip portions in the object retention element.
Figure 51:
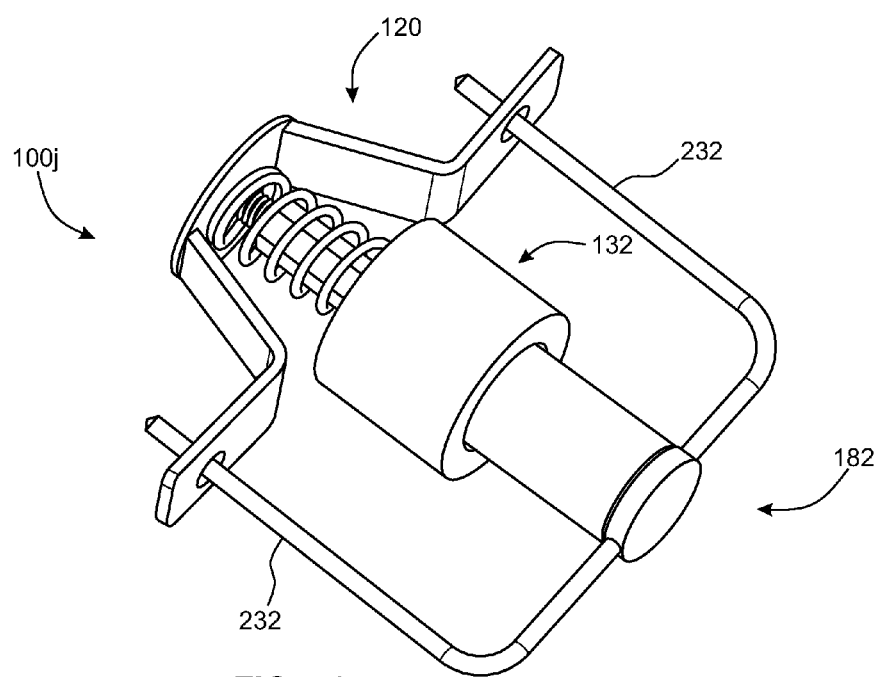
FIG. 51 is a diagrammatic perspective view of the marking apparatus and torqueing tool of FIG. 50 in engagement with one another, thus allowing the torqueing tool to prevent the post element from rotating with respect to the object retention element while the cover element is being rotated to move the tightening element toward its lock position.
Figure 52:
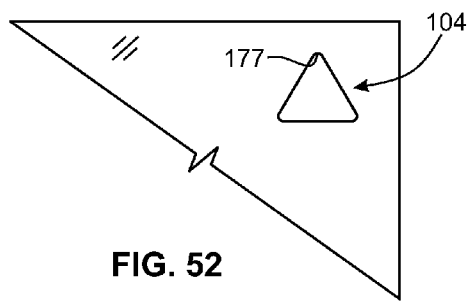
FIG. 52 is a diagrammatic partial plan view of an object with one alternate example shape of a slide mount slot.
Figure 53:
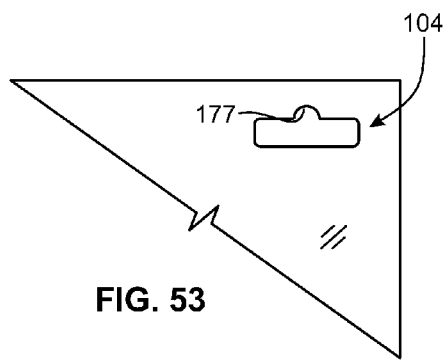
FIG. 53 is a diagrammatic partial plan view of an object with another alternate example shape of a slide mount slot.
Figure 54:
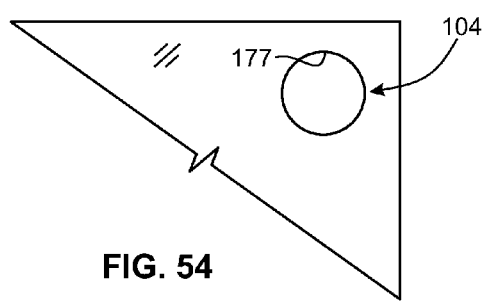
FIG. 54 is a diagrammatic partial plan view of an object with another alternate example shape of a slide mount slot.
Figure 55:
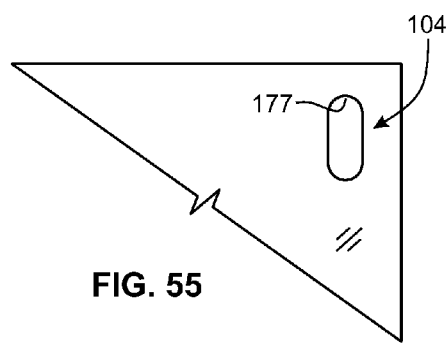
FIG. 55 is a diagrammatic partial plan view of an object with another alternate example shape of a slide mount slot.

Additionally or in the alternative, when the method is being performed using marking apparatuses with a cover retention detent 150 engageable by a torqueing tool 182, the method may further comprise, during the step of rotating, preventing the rotation of the post element 110 about the main axis 118 by way of engagement of the cover retention detent 150 with the torqueing tool 182. As shown in FIGS. 45-47, in certain embodiments of the method, the cover retention detent 150 may include a pair of opposingly-disposed torque engagement grooves 183 for engagement by the torqueing tool 182. FIGS. 50-51 illustrate an alternate embodiment of a torqueing tool 182 which includes one or more torsion lock arms 232 configured to be placed in engagement with grip portions 124 of the object retention element 120. This configuration allows the torqueing tool 182 to prevent the post element 110 from rotating with respect to the object retention element 120 while the cover element 132 remains fully rotatable.

Figure 30:
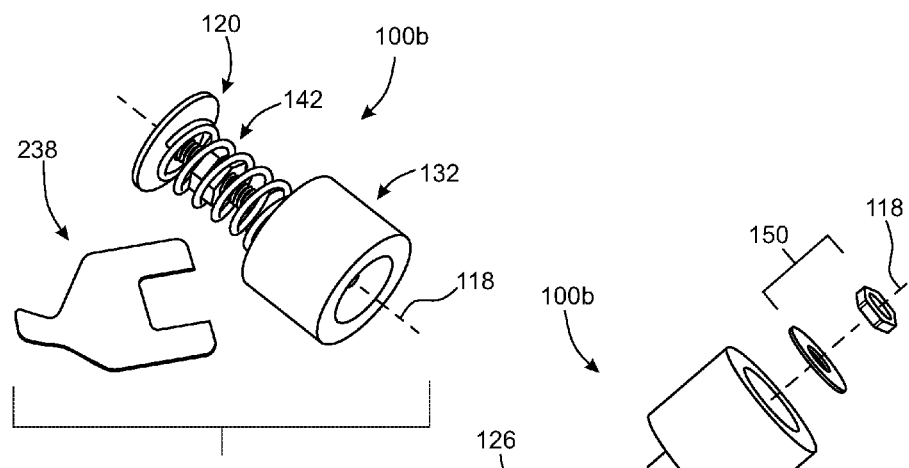
FIG. 30 is a diagrammatic perspective view of yet another example embodiment of a marking apparatus in accordance with the present disclosure.
Figure 31:
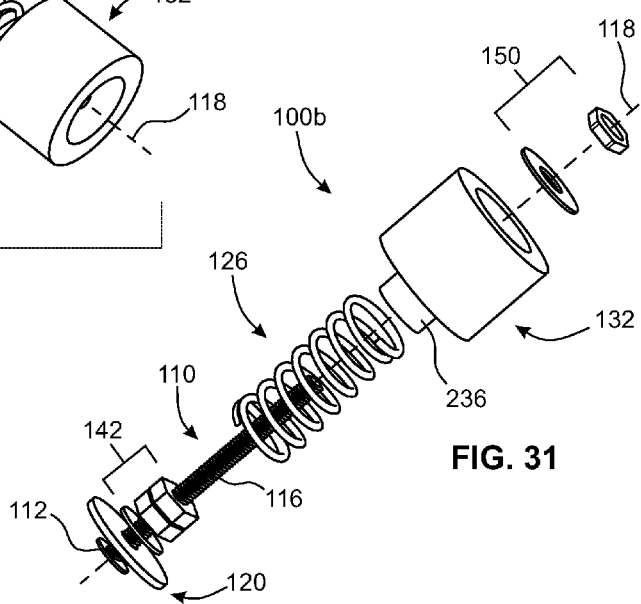
FIG. 31 is a diagrammatic exploded view of the example embodiment of FIG. 30.

With reference to FIGS. 30 and 31, an embodiment of a marking apparatus 100b is shown in which the tightening element is made from one or more nuts and one or more washers. A torque tool 138 is provided to torqueingly engage the nuts to move the tightening element of this embodiment between its release and lock positions.

Figure 48:
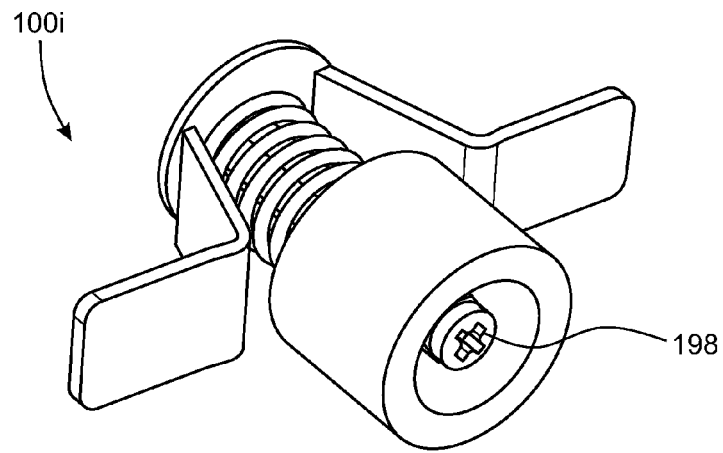
FIG. 48 is a diagrammatic perspective view of yet another example embodiment of a marking apparatus in accordance with the present disclosure, wherein the marking end is a marking end screw coupled to the shaft portion of the post element by way of a threaded coupler.
Figure 49:
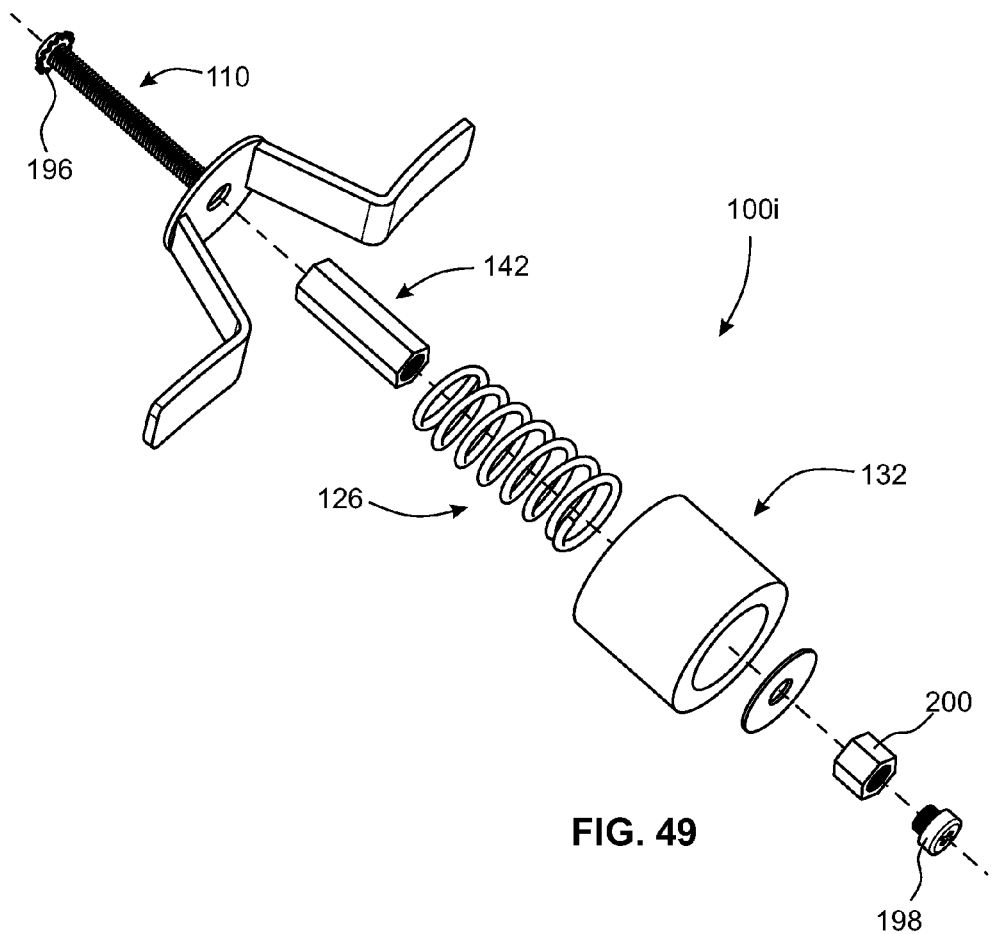
FIG. 49 is a diagrammatic exploded view the embodiment of the marking apparatus shown in FIG. 48.

With reference to FIGS. 48 and 49, an embodiment of a marking apparatus 100i is shown in which the marking end 114 is formed by a marking end screw 198 connected to the shaft portion 116 by way of a threaded coupler 200. In FIGS. 48 and 49, the marking end screw 198 has a Phillips-style head. Thus, if necessary, a Philips-type screw driver can be used by the user in order to prevent the rotation of the post element 10 during rotation of the cover element 132.

With reference to FIGS. 50 and 51, an embodiment of a marking apparatus 100j may be provided or otherwise associated with a specially-configured torqueing tool 182. Such a torqueing tool may include, for example, one or more torsion lock arms 232 engageable with respective grip apertures 125 in grip portions 124 (or the like) of the object retention element 120. The center portion of such a torqueing tool may be configured to magnetically engage a cover retention detent 150 non-rotatably affixed to the post element 110. Thus, the specially-configured torqueing tool may engage the marking apparatus 100j so as to allow the torqueing tool to prevent the post element 100 from rotating with respect to the object retention element 120 while the cover element 132 is being rotated to move the tightening element 142 toward its lock position. Optionally, the torsion lock arms 232 may, in particular embodiments, be resiliently biased at an angle outwards of the center portion of the torqueing tool 182 so as to removably retain the torqueing tool in engagement with the marking apparatus 100j.

Figure 61:
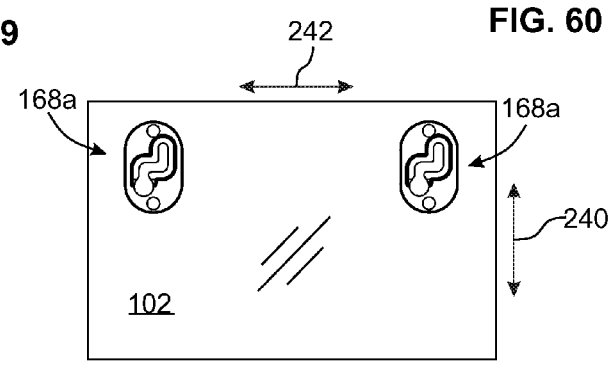
FIG. 61 is a diagrammatic rear view of an object with a pair of secure slide-mount adaptors affixed thereto.

Referring to FIGS. 57-66, embodiments of a secure slide mount adaptor are shown generally at 168a and 168b. Such adaptors are configured to be affixed to an object 102 to facilitate slide-mounting of the object to a mounting surface 108 with a fastener 106 having a fastener head 107 when the object does not have its own integral slide-mount features (such as a keyhole slot on the back of the object, for example). The slide mount adaptors 168a and 168b shown in FIGS. 57-66 are particularly well-suited to facilitate the mounting of an object to a mounting surface 108 in a manner which helps prevent the object from dismounting from the fasteners 106 during, for example, an earthquake. With reference to FIG. 61 for example, random, uncoordinated vertical movement 240 and horizontal movement 242 of the object 102 during an earthquake would be insufficient to cause the slots 176 to traverse the fasteners 106 so as to dismount the object 102 from the mounting surface.

Figure 62:
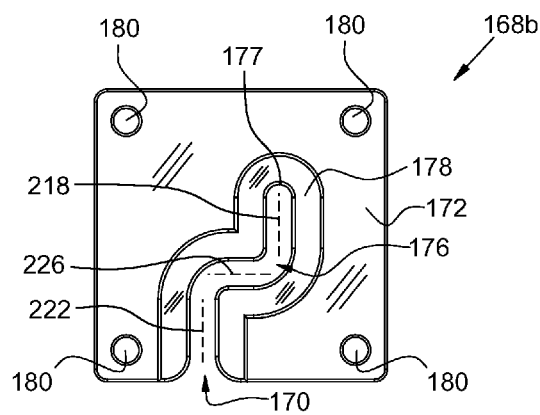
FIG. 62 is a diagrammatic front view of an alternate example of a secure slide-mount adaptor adapted to be affixed to an object to facilitate mounting of the object to a mounting surface.
Figure 63:
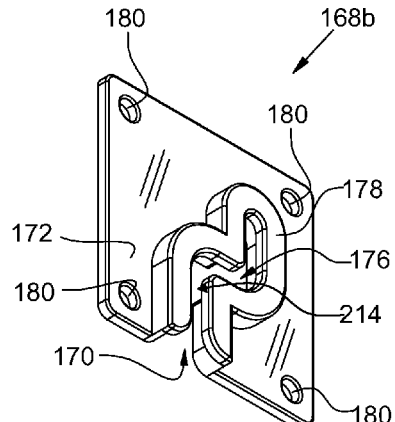
FIG. 63 is a diagrammatic front perspective view of the secure slide-mount adaptor adapted of FIG. 61.
Figure 64:
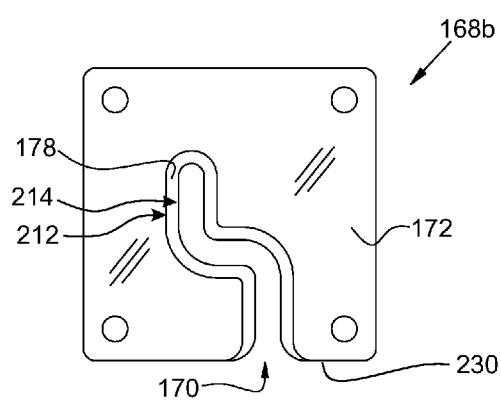
FIG. 64 is a diagrammatic rear view of the secure slide-mount adaptor adapted of FIG. 61.
Figure 65:
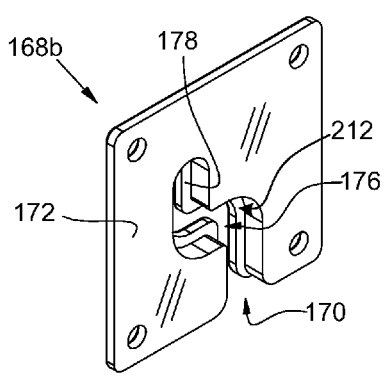
FIG. 65 is a diagrammatic rear perspective view of the secure slide-mount adaptor adapted of FIG. 61.

Preferred embodiments of the secure slide mount adaptor may comprise a base plate 172 and a fastener slot 176. The base plate 172 may preferably include at least two attachment apertures 180 for use in affixing the secure slide-mount adaptor to the respective object 102 by way of, for example, nails, screws or the like. The fastener slot 176 may preferably extend along a tortuous pathway between a fastener head opening (170 and 174) and a slot closed end 177. With reference to FIGS. 62-64, in certain embodiment of the adaptor 168b the fastener head opening 170 may be located at a perimeter edge 230 of the base plate 172. At least a portion of the fastener slot 176 may have a head channel portion 212 and a narrower shaft channel portion 214. The shaft channel portion 214 may be defined at least in part by an inwardly-projecting mounting lip 178.

Figure 57:
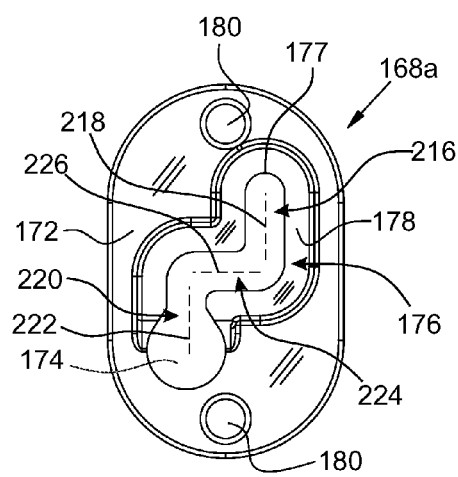
FIG. 57 is a diagrammatic front view of one example of a secure slide-mount adaptor adapted to be affixed to an object to facilitate mounting of the object to a mounting surface.
Figure 58:
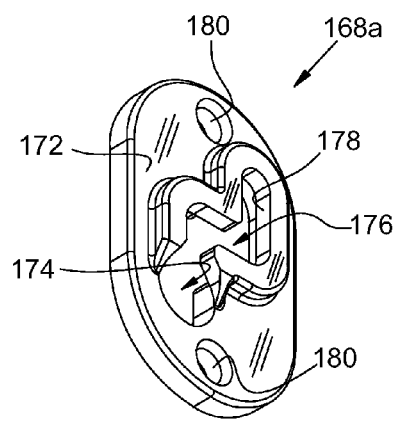
FIG. 58 is a diagrammatic front perspective view of the secure slide-mount adaptor adapted of FIG. 57.
Figure 59:
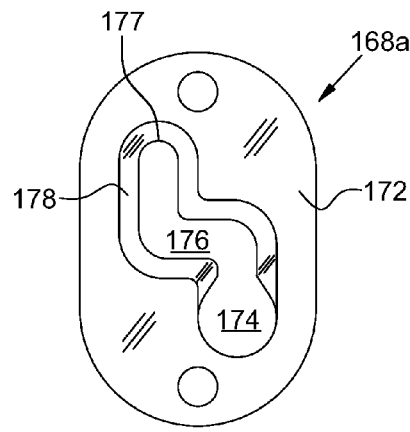
FIG. 59 is a diagrammatic rear view of the secure slide-mount adaptor adapted of FIG. 57.
Figure 60:
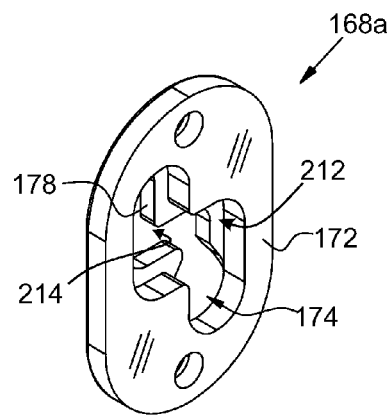
FIG. 60 is a diagrammatic rear perspective view of the secure slide-mount adaptor adapted of FIG. 57.

Referring to FIGS. 57 and 62, in an embodiment of a secure slide-mount adaptor, the fastener slot 176 may include a proximal segment 216 extending from the slot closed end 177 along a proximal axis 218, a distal segment 220 extending from the fastener head opening (170 or 174) along a distal axis 222, and a medial segment 224 extending between the proximal and distal segments. The proximal and distal segments may preferably be laterally offset from one another, with the respective proximal and distal axes being parallel or non-parallel to one another.

Figure 66:
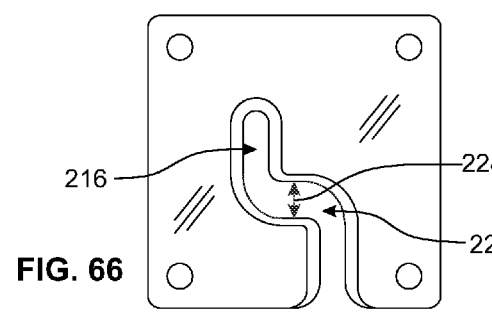
FIG. 66 is a diagrammatic rear view of the secure slide-mount adaptor adapted of FIG. 61, wherein the shaft channel portion has a shaft channel width which is greater at the medial segment than at the proximal segment.

Referring to FIG. 66 for illustration, in particular embodiments of a secure slide-mount adaptor, the shaft channel portion 214 may have a shaft channel width 228 which is greater at the medial segment 224 than at the proximal segment. Such a configuration may be particularly well adapted to allow a rotational detent member 204 to traverse the fastener slot 176 while a respective marking apparatus post element 110 is being moved laterally through the medial segment 224 of the adaptor.

In certain embodiments of a secure slide-mount adaptor, the medial segment 224 may extend along a medial axis 226. In such embodiments, the proximal axis 218 and distal axis 222 may be parallel to one another, and the medial axis 226 may be oriented at less than 180 angular degrees with respect to the proximal axis. For example, the medial axis 226 may be perpendicular to the proximal and distal axes, or the three combined axes may form, for example, an "N" shape or the like.

Figure 67:
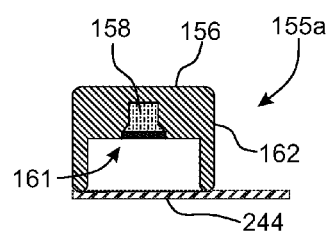
FIG. 67 is a diagrammatic cross-sectional view of one example of a cap-type marking applicator in accordance with the present disclosure, including a disposable film applicator seal.
Figure 68:
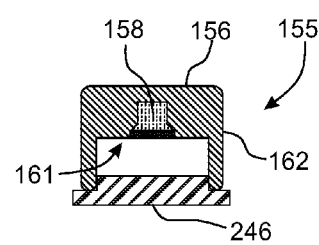
FIG. 68 is a diagrammatic cross-sectional view of a cap-type marking applicator similar to that of FIG. 67, but in which the removable applicator seal is configured to internally snap-fit or press-fit into engagement with the marking applicator.
Figure 69:
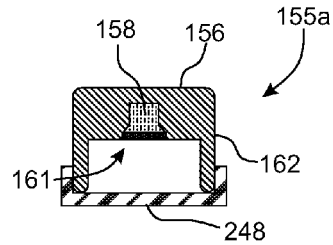
FIG. 69 is a diagrammatic cross-sectional view of a cap-type marking applicator similar to that of FIG. 68, but in which the removable applicator seal is configured to externally snap-fit or press-fit into engagement with the marking applicator.
Figure 70:
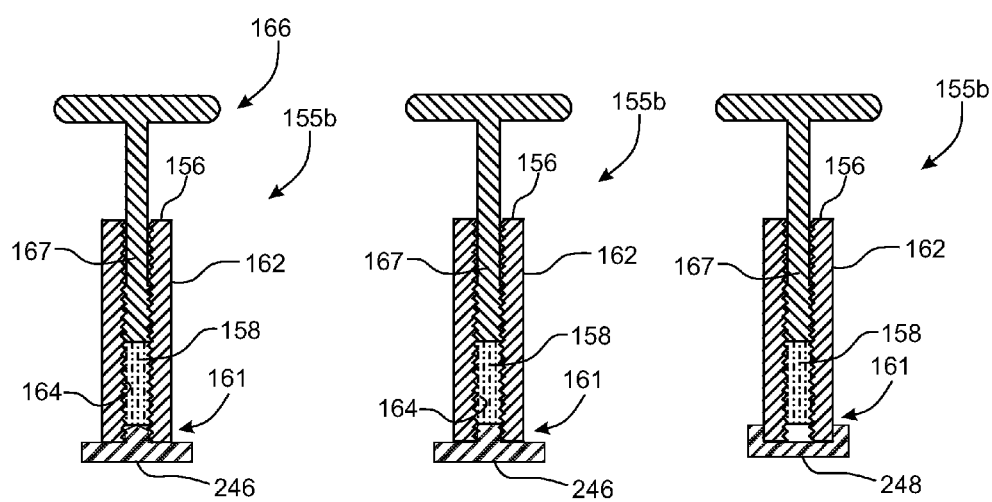
FIG. 70 is a diagrammatic cross-sectional view of one example of a plunger-type marking applicator, in which the removable applicator seal is configured to internally snap-fit or press-fit into engagement with the delivery portion of the applicator body.
Figure 71:
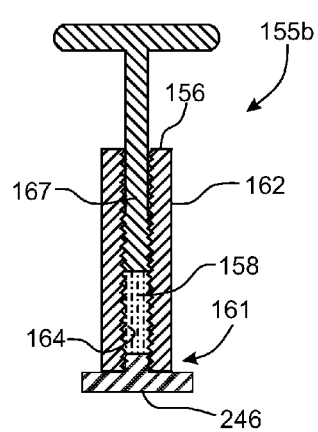
FIG. 71 is a diagrammatic cross-sectional view of a plunger-type marking applicator similar to that of FIG. 70, but in which the removable applicator seal is configured to internally threadedly engage the delivery portion of the applicator body.
Figure 72:
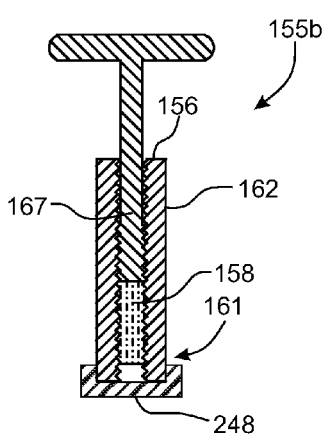
FIG. 72 is a diagrammatic cross-sectional view of a plunger-type marking applicator similar to that of FIG. 70, but in which the removable applicator seal is configured to externally snap-fit or press-fit into engagement with the delivery portion of the applicator body.

FIGS. 67-69 illustrate various applicator seals that can be used to prevent the marking substance from drying out over time. For example, as shown in FIG. 67, the cap-type marking applicator 155a may employ a reusable or disposable film 244 with adhesive properties. Referring to FIG. 68, the removable applicator 246 seal may be configured to internally snap-fit, press-fit or threaded into engagement with the marking applicator. Referring to FIG. 69, the removable applicator seal 248 may be configured to externally snap-fit or press-fit into engagement with the marking applicator. Similarly, FIGS. 70-72 illustrate various applicator seals that can be used to provide the marking substance from drying out over time in a plunger-type applicator. Referring to FIG. 70, the removable applicator seal 246 is configured to internally snap-fit or press-fit into engagement with the delivery portion 161 of the applicator body 162. Referring to FIG. 71, the removable applicator seal 246 is configured to internally threadedly engage the delivery portion 161 of the applicator body 162. Referring to FIG. 72 the removable applicator seal 248 is configured to externally snap-fit or press-fit into engagement with the delivery portion 161 of the applicator body 162.

Figure 73:
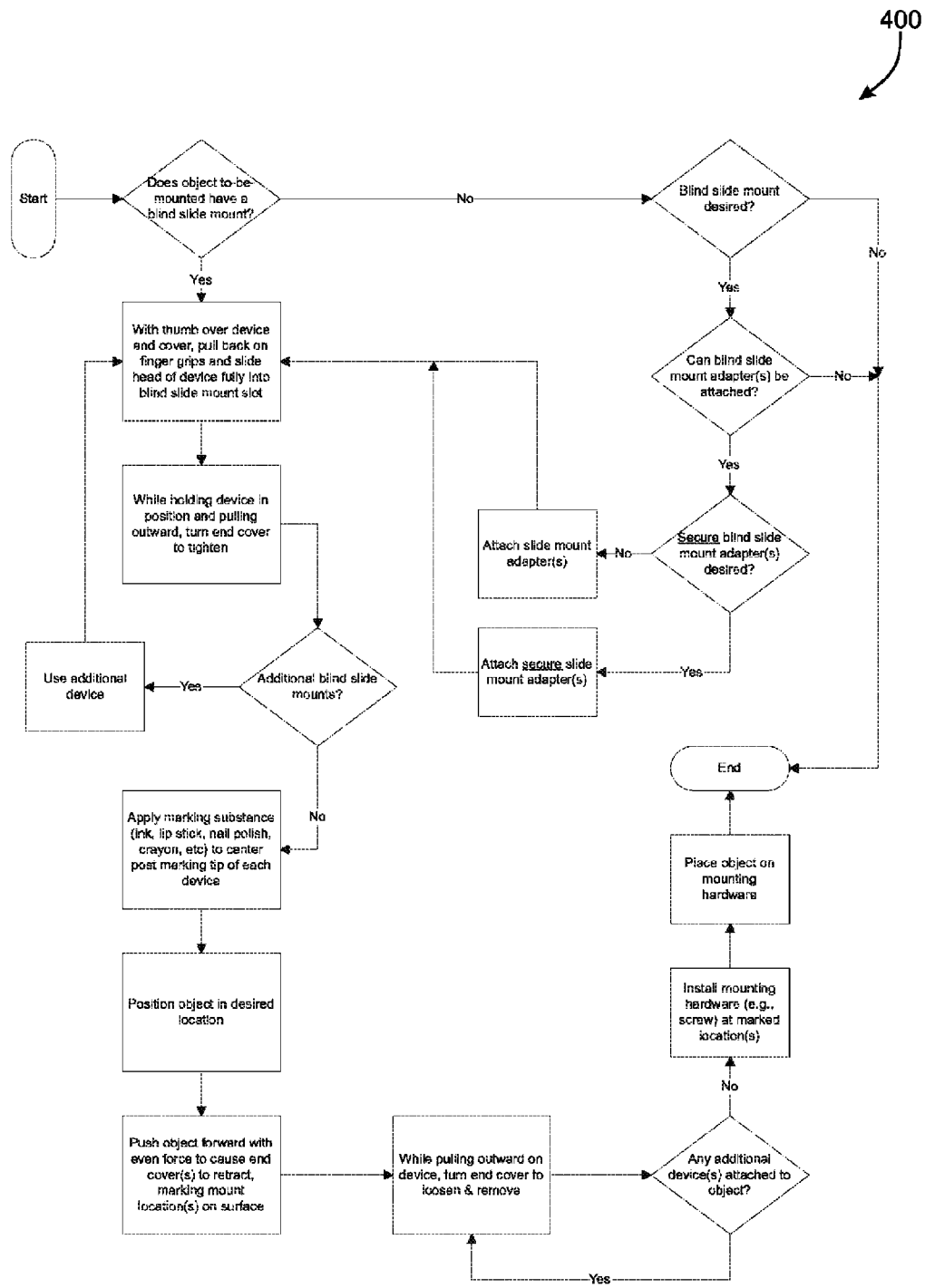
FIG. 73 is an example flow diagram illustrating one overview method for using a blind slide-mount marking apparatus in accordance with the present disclosure, particularly an apparatus that does not have a rotational detent member disposed laterally of the shaft portion.
Figure 74:
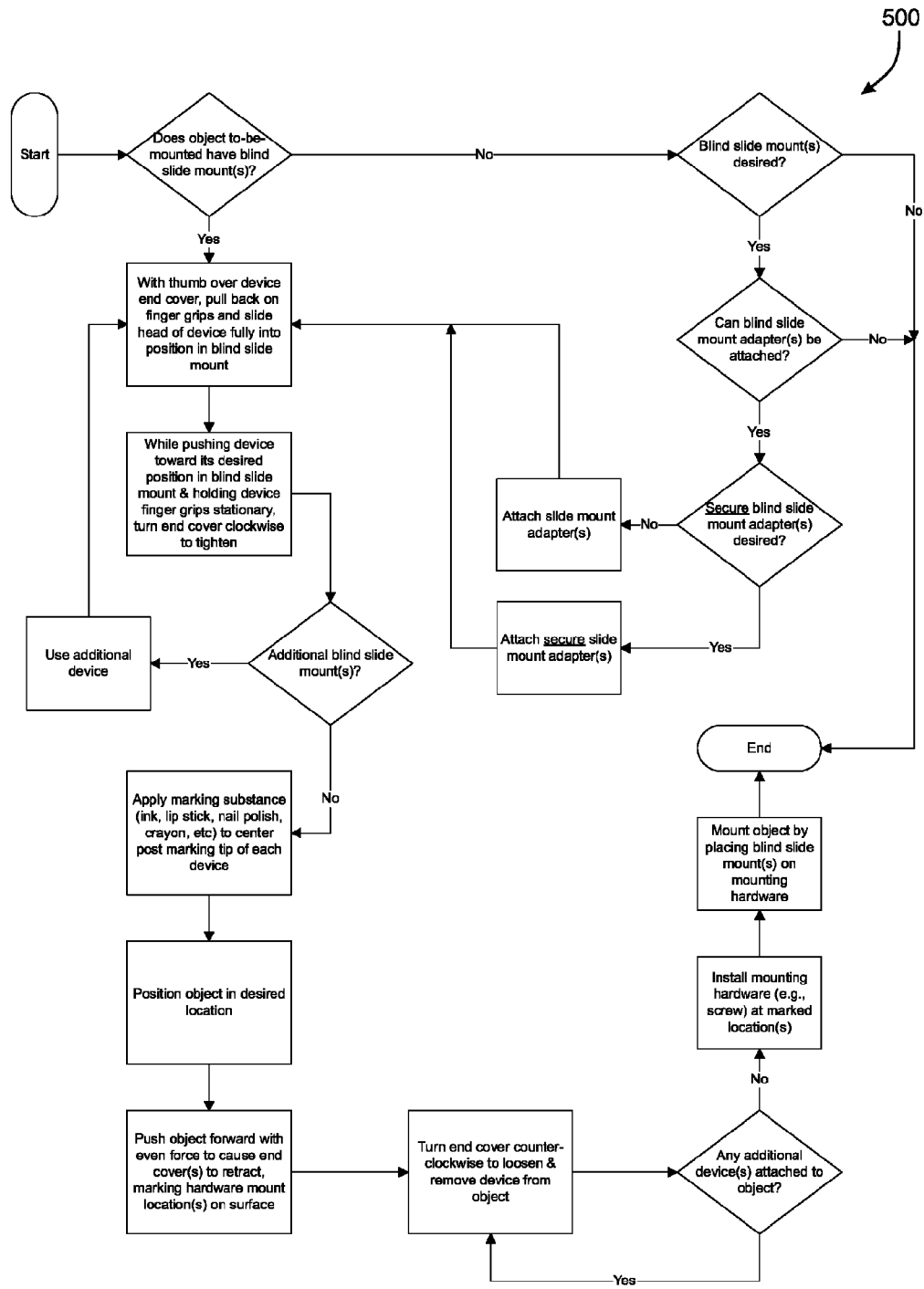
FIG. 74 is an example flow diagram illustrating an alternate overview method for using a blind slide-mount marking apparatus in accordance with the present disclosure, particularly an apparatus that has a rotational detent member disposed laterally of the shaft portion.

Referring to FIG. 73, an example flow diagram 400 illustrates one example overview method for using a blind slide-mount marking apparatus in accordance with the present disclosure, particularly a marking apparatus that does not have a rotational detent member disposed laterally of the shaft portion; and Referring to FIG. 74, an example flow diagram 500 illustrates an alternate overview method for using a blind slide-mount marking apparatus in accordance with the present disclosure, particularly a marking apparatus that has a rotational detent member disposed laterally of the shaft portion.

A marking apparatus may otherwise be referred to herein as a blind slide-mount attachment location device, or otherwise "device" or "apparatus." It is envisioned that kits may be produced and sold which include one or more such devices. Embodiment of a marking apparatus as described and claimed herein permits a physical object that is to be mounted to be used as its own mounting "template," thereby ensuring the accuracy of the attachment locations on a mounting surface (a) without the need for the use of paper templates or measurements and (b) with consideration for potential interference with nearby articles and visual appeal.

Embodiments of a marking apparatus may be configured for use on any object that comes with a blind slide-mount provision (for example, a keyhole or the like), and on any other objects that can accommodate the attachment of a blind slide-mount adaptor. As for the latter, there is only need for approximate placement of the adaptors, such as those illustrated for example at FIGS. 57-66, on the object 102 as the blind slide-mount attachment-hole locator system allows for correct visual alignment of the object 102 onto the mounting surface 108 independent of the accuracy of the adaptor's horizontal or vertical position on the object 102.

Preferred examples of the marking apparatus may be used with any object to be mounted that has provision for one or more slide mount slots 104. Such provisions may include, for example, one or more slide mount slots 104 integrally formed with the object 102 or slide mount slots 104 formed in adaptors affixed to the surface of the object. Examples of the former would include many conventional power strips, phone bases, phone handset charging bases, network routers, cable boxes, small appliance bases, and the like. Examples of the latter would include mirrors, picture frames, decorative wall items, and the like.

The term "slide mount" may preferably be used herein to refer to a mounting receptacle, such as a keyhole, that has an opening, typically a slot, to engage the head of the mounting hardware that is installed in or on the mounting surface 108.

The term "blind" may preferably be used herein to describe the inability to see and directly mark the slide mount fastener attachment location on the mounting surface given that the slide mount is behind or on the back of the object to be mounted.

The term "mounting hardware" may preferably be used herein to refer to the hardware item located in or on the mounting surface at the attachment location that engages the slide mount slot. Examples of mounting hardware may include screws, nails, bolts, picture hangers and the like.

There term "center post" (or post element 110) may preferably be used herein to refer to a central construction element which comprises a first end, a second end, and a center section (e.g., shaft portion 116). The first end may include a head portion 110. The second end may include a marking tip 114. An outer surface of the center section (shaft portion 116) may preferably be at least partially covered with a helical ridge (e.g., screw threads).

The head portion 112 may be located at the first end of the post element 110 and may preferably take the form of a protuberance which is configured to engage and grip a slide mount slot from the underside/inside.

A holding surface (e.g., object retention element 120) may be adapted to engage a slide mount slot 104 from the outer surface to sandwich the slide mount lip material between it and the head portion 112 of the post element 110. The object retention element 120 may include or be integrated with the finger grip portions 124.

A tightening element 142 may preferably be provided for tightening the object retention element 120, slide mount material (such as a keyhole slot lip 105), and head portion 112 together. Threaded transport of the tightening element 142 along the threaded shaft portion 116 to and from the head portion 112 may preferably be driven by corresponding rotation of the end cover (cover element 132).

A resilient biasing element 126 may be configured to exert a biasing force on the retention element 120 to temporarily hold the head portion 112 in the object's respective slide mount slot until the tightening element 142 is transported into its retaining or lock position (e.g., "tightened"). The biasing element may also resiliently force the cover element 132 toward its extended position (see, for example, FIG. 23) to keep the marking tip away from the surface to be marked until the object 102 to be marked is pushed to mark the mounting surface 108 (see, for example, FIG. 24). The biasing element 126 may be in the form of a compression spring, a leaf spring (see, for example, the object retention element in FIG. 36), or the like. Referring to FIGS. 5 and 33, in certain preferred embodiments of a marking apparatus, the cover element 132 may include a spring alignment groove 234, a spring alignment boss 236, or the like, in order to keep the spring element 126 from slipping laterally of the main axis 118 during operation of the marking apparatus.

The term "grip range" (annular slot or lip groove 128) may be used herein to describe the maximum space between the head portion 112 and the object retention element 120 that is created when the finger grip portions 124 are fully pulled back toward the cover element 132. The grip range may define the maximum slide mounting lip material thickness that can be accommodated by the respective marking apparatus.

Referring to FIGS. 57-66 for particular examples, one or more secure slide mount adaptors (e.g., 168a and 168b) may be added to an object which has sufficient attachment surface area. Referring to FIG. 61 for illustration, the secure slide mount adaptor may have two or more segments of a continuous slot oriented at angles to each other such that specific coordination of two or more different directional motions (e.g., vertical 240 and horizontal 242) are required in order to mount or dismount an object 102 from the mounting surface 108.

Preferred embodiments of a device or apparatus 100 may be used for marking one or more attachment locations for mounting an object 102 that utilizes a blind slide mount mounting system (e.g., keyhole features). The post element 110 may have a head portion 112 on one end and a marking end or tip 114 on the other end, with threads in-between, and a diameter that is less than the smallest portion of the slide-mount.

A head portion 112 may be larger than the slide mount slot 104, to engage the slide mount. In some embodiments, the underside of the head portion 112 may be treated in some fashion to increase frictional contact with the slide mount material (e.g., slot lips 105).

Integrated finger grip portions 124 may be provided, to allow the object retention element 120 to be pulled back to form an annular slot or lip groove 128 for easy insertion of the head portion 112 and shaft portion 116 into the slide mount slot 104 and to allow the user to visually verify correct center post position in the slide mount slot.

A tightening element 142 may be provided for securing the apparatus to the slide mount of the object 102.

Certain preferred examples of a cover element 132 may have a smooth face and be concentric with the post element 110. The cover element may be adapted to be moved into a retracted position (see, for example, FIG. 24) when the object is pushed toward the mounting surface 108, thereby allowing a marking substance 154 on the marking end 114 to mark the mounting surface 108 where the mounting fastener 106 is to be placed. A mounting fastener 106 may preferably include a fastener head 107. In some embodiments of a marking apparatus 100, such as the one shown in FIG. 23, the cover element 132 includes a surface engagement portion 136 which may have radiused or beveled edges to ensure smooth translational (sliding) movement across the mounting surface 108 during alignment of the object prior to marking.

A biasing element 126 may be positioned concentrically with the post element 110 and may preferably serve the multiple purposes of holding the head portion 112 in place against the mounting lip 105 of the slide mount slot 104 until the tightening element 142 is transported to its retaining or lock position (see, for example, FIG. 16) as well as keeping a retractable cover element 132 in its extended position until the mounting surface 108 marking push-action is enacted.

The functional capabilities and limitations of particular aspects of the marking apparatus 100 may be driven by the interaction between the dimensions of its components. For example, grip range may depend on the length of the post element 110 and tightening element 142, and the position of locking mechanism 150. Also, the distance of the marking end 114 below the surface engagement portion 136 of the cover element 132 when the cover element is in its extended position may depend on the respective lengths of the post element 110 and the cover element 132, the thickness of the bottom of the cover element 132, and the position of the locking mechanism 150. Similarly, the force provided by the biasing element 126 may depend on the biasing element length, lengths of the post element 110 and the tightening element 142, thickness of the bottom of the cover element 132, and the position of the locking mechanism 150. The amount of tightening element 142 engagement in the cover element 132 depends on lengths of the post element 110 and tightening element 142, cover element 132 bottom thickness, and position of locking mechanism Referring to FIGS. 12-16, a cap-type marking tip applicator 155a may be adapted to work automatically when the applicator cap 156 and the finger grip portions 124 are forced toward one another to extend the head portion 112 to mount the apparatus 100 to the object 102 (see, for example, FIGS. 13 and 14). These forces may in turn cause the cover element 132 to move to its retracted position, thereby pressing the marking end 114 into the marking pad 160 of the applicator 155a, where the marking end 114 can pick up a patch 154 of the marking substance 158. In some cases, the cap-type marking tip applicator 155a may preferably be adapted such that the rotation of the applicator cap 156 causes the cover element 132 to rotate in the same direction. Referring to FIGS. 13 and 14, the lock element 150 may be adapted in part to engage a shaft detent portion 157 at the inner surface of the applicator cap 156 to limit the distance the marking tip 114 may travel toward the applicator reservoir 164.

Referring to FIGS. 18-22, a plunger-type marking tip applicator 155b may be provided to slip over or threadedly engage the portion of the shaft portion 116 proximate to the marking end 114. A plunger element 166 may enable the extrusion of a more viscous marking substance 158 (e.g., lipstick, paint, crayon, nail polish, chalk, or the like) onto the marking end 114. In the alternative, the plunger mechanism may be substituted with a liquid marking substance and a marking pad. Moreover, certain preferred embodiments of the apparatus 100 may be used without relying on a formal marking tip applicator. In such case, a marking substance selected by the user may be applied manually and directly to the marking end 114. In certain embodiments of the cap-type marking tip applicator and the plunger-type marking tip applicator, the applicator reservoirs 164 may be refillable.

Advantages of preferred embodiments of the marking apparatus and associated methods in accordance with the present disclosure include one, more or all of the following: (a) allow the use of the object to be mounted as the alignment "template," thereby assuring accurate and visually-pleasing mounting without interfering with other nearby objects; (b) eliminate the need for paper templates or measurements to establish mount hole location; (c) will work on all slide mount materials and virtually all slide-mount slot configurations; (d) the marking apparatus securely tightens to the object to be mounted to ensure no mount hole location error on the mounting surface; (e) the marking apparatus will work on nearly any mounting surface (soft or hard); (f) can employ a wide variety of common substances for marking, which also allows for choice of marking color for dark, light, or colored mounting surfaces; (g) retractable/extendable marking end ensures no accidental marks on mounting surface while positioning, with marking being accomplished by push-to-mark action of the object to be mounted; (h) "floating" tightening element ensures the marking end is always at the same distance below the surface engagement portion of the cover element when the cover element is in its extended position, thereby providing a user with the same push-to-mark "feel" each time used; and (i) finger grips may be used to extend slot-engaging head, allowing for visual confirmation that the shaft portion of the post element is located at the slot end.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A marking apparatus for facilitating blind slide-mounting of an object to a mounting surface in a desired alignment using the object as an alignment template, the apparatus comprising:
    (a) a post element including a head portion, a marking end and a shaft portion extending therebetween along a main axis, the shaft portion being at least partially threaded;
    (b) an object retention element movable with respect to the post element along the main axis between a closed position, an open position, and a gripping position therebetween, wherein:
        (i) the object retention element is resiliently biased toward the closed position,
        (ii) movement of the object retention element from the closed position to the open position results in a presentation of a lip groove for receiving a mounting lip of an object, the lip groove being at least partially defined by a gap distance between the head portion and the object retention element, and
        (iii) movement of the object retention element from the open position to the gripping position results in a reduction of the gap distance for securement of the mounting lip within the lip groove with a gripping force;
    (c) a tightening element threadedly transportable along the shaft portion between a release position and a lock position, thereby being configured to:
        (i) when in the release position, allow movement of the object retention element between the closed position and the open position,
        (ii) when in the lock position, prevent movement of the object retention element from the gripping position toward the open position, and
        (iii) enable adjustability of the gripping force; and
    (d) a cover element configured to engage the tightening element so as to restrict relative rotational movement therebetween about the main axis while enabling relative axial movement therebetween.

2. A marking apparatus as defined in claim 1 wherein the object retention element includes one or more finger grip portions extending radially of the main axis.

3. A marking apparatus as defined in claim 1 wherein:
    (a) the cover element includes a surface engagement portion and is movable with respect to the post element along the main axis between an extended position and a marking position; and
    (b) the surface engagement portion
        (i) extends axially beyond the marking end when the cover element is in the extended position, and
        (ii) is axially aligned with or inward of the marking end when the cover element is in the marking position.

4. A marking apparatus as defined in claim 3 wherein the cover element is elastically biased toward the extended position.

5. A marking apparatus as defined in claim 4 further comprising a spring element, resilient bias and elastic bias being provided by way of the spring element.

6. A marking apparatus as defined in claim 5 wherein the resilient bias and elastic bias are provided by way of the object retention element.

7. A marking apparatus as defined in claim 4 further comprising a cover retention detent affixed to the post element, wherein the cover retention detent
    (a) axially retains the cover element on the post element, and
    (b) limits the axial distance between the surface engagement portion and the marking end when the cover element is in the extended position.

8. A marking apparatus as defined in claim 7 wherein the cover retention detent is
    (a) non-rotatably secured to the post element, and
    (b) configured to be engaged by a torqueing tool.

9. A marking apparatus as defined in claim 8 wherein the cover retention detent includes a pair of opposingly-disposed torque engagement grooves for engagement by the torqueing tool.

10. A marking apparatus as defined in claim 1 wherein the adjustability of the gripping force enables the gripping force to be increased sufficiently so as to rigidly affix the marking apparatus to the object.

11. A marking apparatus as defined in claim 1 wherein the tightening element includes at least one radially-extending alignment member and the cover element includes at least one axially-extending slot for axially-slidable receipt of the at least one alignment member, thereby providing:
    (a) the restriction in relative rotational movement between the tightening element and the cover element about the main axis; and
    (b) the enablement of relative axial movement between the tightening element and the cover element.

12. A marking apparatus as defined in claim 1 further comprising a marking applicator including an applicator body having a distal end, a delivery portion, and a reservoir therebetween, the reservoir containing a marking substance, the delivery portion being configured to engage the post element for depositing a marking patch of the marking substance to the marking end.

13. A marking apparatus as defined in claim 12 wherein the applicator body is removably securable to the cover element;
    wherein, when the cover element is moved toward the marking position with the applicator body secured to the cover element, the marking applicator is configured to apply a said marking patch to the marking end.

14. A marking apparatus as defined in claim 12 wherein the delivery portion is adapted to receivingly attach to a segment of the shaft portion at the marking end, and the marking applicator includes a plunger element with a plunger shaft axially actuatably extending into the reservoir.

15. A marking apparatus as defined in claim 1 wherein the head portion includes an inner face having one or more frictional engagement facets.

16. A marking apparatus as defined in claim 1 wherein the post element includes a rotational detent member disposed laterally of the shaft portion, the rotational detent member being configured to engage the object retention element so as to restrict or prevent rotation of the post element with respect to the object retention element about the main axis.

17. A marking apparatus as defined in claim 16 further comprising a spacer element disposed about the shaft portion axially between the object retention element and the tightening element, the spacer element being configured to receive at least a portion of the rotational detent member therein.

18. A marking apparatus as defined in claim 16 wherein the object retention element includes a visually perceptible rotational orientation indicator.

19. A method of blind slide-mounting an object to a mounting surface in a desired alignment using the object as an alignment template, the method comprising:
    selecting an object for blind-slide mounting to a mounting surface, the object having at least one slide mount slot, each at least one slide mount slot having a corresponding mounting lip and a slot closed end;
    providing a marking apparatus comprising:
    (a) a post element including a head portion, a marking end and a shaft portion extending therebetween along a main axis, the shaft portion being at least partially threaded;
    (b) an object retention element movable with respect to the post element along the main axis between a closed position, an open position, and a gripping position therebetween, wherein:
        (i) the object retention element is resiliently biased toward the closed position,
        (ii) movement of the object retention element from the closed position to the open position results in the presentation of a lip groove for receiving a respective said mounting lip, the lip groove being at least partially defined by a gap distance between the head portion and the object retention element,
        (iii) movement of the object retention element from the open position to the gripping position results in a reduction of the gap distance for securement of the respective mounting lip within the lip groove with a gripping force, and
        (iv) the object retention element includes one or more finger grip portions extending radially of the main axis;
    (c) a tightening element threadedly transportable along the shaft portion between a release position and a lock position, thereby being configured to:
        (i) when in the release position, allow movement of the object retention element between the closed position and the open position,
        (ii) when in the lock position, prevent movement of the object retention element from the gripping position toward the open position, and
        (iii) enable adjustability of the gripping force; and
    (d) a cover element configured to engage the tightening element so as to restrict relative rotational movement therebetween about the main axis while enabling relative axial movement therebetween, the cover element including a surface engagement portion and being movable with respect to the post element along the main axis between an extended position and a marking position, the cover element being elastically biased toward the extended position, wherein the surface engagement portion
        (i) extends axially beyond the marking end when the cover element is in the extended position, and
        (ii) is axially aligned with or inward of the marking end when the cover element is in the marking position;
    moving the object retention element to its open position;
    inserting the head portion into a respective said slide mount slot
    sliding the lip groove into receipt of the respective mounting lip at the slot closed end;
    allowing the object retention element to move to its gripping position;
    rotating the cover element so as to threadedly transport the tightening element to its lock position;
    applying a marking substance to the marking end;
    positioning the object in desired mounting alignment along the mounting surface with the surface engagement portion being in contact with the mounting surface;
    pushing the object toward the mounting surface so as to cause the cover element to move to its marking position, thereby causing a volume of the marking substance to be transferred from the marking end to a respective mark location on the mounting surface;
    installing a respective slide-mount fastener at the mark location; and
    mounting the object to the mounting surface by way of mounting engagement between the slide-mount fastener and the respective slide mount slot.

20. A method as defined in claim 19 wherein
    (a) in the step of selecting, the selected object has two or more said slide mount slots;
    (b) the step of providing includes providing one or more additional said marking apparatuses; and
    (c) the remaining steps are performed in association with all of the marking apparatuses.

21. A method as defined in claim 19 wherein the step of moving the object retention element to its open position is achieved by using one hand to squeeze the cover element and the object retention element toward one another with a thumb of the one hand disposed across the surface engagement portion and fingers of the one hand gripping the one or more finger grip portions.

22. A method as defined in claim 19 wherein
    (a) the marking apparatus further comprises a cover retention detent affixed to the post element, wherein the cover retention detent
        (i) axially retains the cover element on the post element,
        (ii) limits the axial distance between the surface engagement portion and the marking end when the cover element is in the extended position,
        (iii) is non-rotatably secured to the post element, and
    (b) the method further comprises:
        (i) during the step of rotating, imposing a pulling force on the cover element axially outward of the respective slide mount slot.

23. A method as defined in claim 19 wherein
    (a) the marking apparatus further comprises a cover retention detent affixed to the post element, wherein the cover retention detent
        (i) axially retains the cover element on the post element, (ii) limits the axial distance between the surface engagement portion and the marking end when the cover element is in the extended position, (iii) is non-rotatably secured to the post element, and (b) the method further comprises:

(i) during the step of rotating, preventing the rotation of the post element about the main axis by way of engagement of the cover retention detent with a torqueing tool.

24. A method as defined in claim 23 wherein the cover retention detent includes a pair of opposingly-disposed torque engagement grooves for engagement by the torqueing tool.

\* \* \* \* \*